United States Patent
Johnson et al.

[11] Patent Number: 5,909,463
[45] Date of Patent: Jun. 1, 1999

[54] SINGLE-CHIP SOFTWARE CONFIGURABLE TRANSCEIVER FOR ASYMMETRIC COMMUNICATION SYSTEM

[75] Inventors: Terence L. Johnson; Peter R. Molnar; Howard E. Levin; Jeffrey P. Gleason; Robin Wiprud; Sujit Sudhaman, all of Austin; Jody Everett, Buda; Michael R. May, Austin; Carlos A. Greaves, Austin; Mathew A. Rybicki, Austin; Matthew A. Pendleton, Cedar Park; John M. Porter, Round Rock, all of Tex.

[73] Assignee: Motorola, Inc., Schaumburg, Ill.

[21] Appl. No.: 08/741,634

[22] Filed: Nov. 4, 1996

[51] Int. Cl.⁶ ............... H04B 1/38; H04B 1/56; H04L 5/14; H04L 5/16
[52] U.S. Cl. .............. 375/220; 375/220; 375/219; 375/221; 375/222; 370/276; 370/295; 370/464; 370/480; 455/73
[58] Field of Search ............................. 375/220, 219, 375/221, 222, 223; 370/276, 295, 296, 464, 480, 389, 395, 403, 404, 402, 400, 401; 455/73

[56] References Cited

U.S. PATENT DOCUMENTS

| | | | |
|---|---|---|---|
| 4,438,511 | 3/1984 | Baran | 370/94 |
| 4,597,073 | 6/1986 | Staples | 370/24 |
| 4,679,227 | 7/1987 | Hughes-Hartogs | 379/98 |
| 4,731,816 | 3/1988 | Hughes-Hartogs | 379/98 |
| 4,890,316 | 12/1989 | Walsh et al. | 379/98 |
| 4,980,897 | 12/1990 | Decker et al. | 375/38 |
| 5,586,121 | 12/1996 | Moura et al. | 370/404 |

OTHER PUBLICATIONS

Adiraensen et al., Single chip DMT–modem transceiver for ADSL, Proceedings of the 9th IEEE International ASIC Conference and Exhibit, pp. 123–126, Sep. 23, 1996.

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171.

*Primary Examiner*—Stephen Chin
*Assistant Examiner*—Michael W. Maddox
*Attorney, Agent, or Firm*—Paul J. Polansky

[57] ABSTRACT

A transceiver (5) for an asymmetric communication system such as asymmetric digital subscriber line (ADSL) includes a configuration register (71) defining operation at either a central office (CO) or a remote terminal (RT). The configuration register (71) includes a control bit (72) for selecting either CO or RT mode. The transceiver (5) includes a signal processing module (70) configured according to the state of the control bit (72). For example, a digital interface (70) converts transmit data into transmit symbols and converts received symbols into receive data. The digital interface (70) uses a large memory (158) as a buffer in the transmit path and a small memory (160) as a buffer in the receive path in CO mode. In RT mode, the digital interface (70) uses the small memory (160) in the transmit path and the large memory (158) in the receive path. The selective configuration allows a single integrated circuit to be used in both CO and RT equipment.

40 Claims, 9 Drawing Sheets

SINGLE-CHIP SOFTWARE CONFIGURABLE TRANSCEIVER FOR ASYMMETRIC COMMUNICATION SYSTEM

CROSS REFERENCE TO RELATED, COPENDING APPLICATIONS

This application is related to a commonly assigned copending patent application No. 08/741,635, entitled "An Apparatus and Method for Auto-Configuring a Communication System" invented by Terence L. Johnson et al and filed of even date herewith.

FIELD OF THE INVENTION

This invention relates generally to communications, and more particularly, to a transceiver for an asymmetric communication system.

BACKGROUND OF THE INVENTION

In order to make high data rate interactive services such as video and internet access available to more residential and small business customers, high-speed data communications paths are required. Although fiber optic cable is the preferred transition media for such high data rate services, it is not readily available in existing communication networks and the expense of installing fiber optic cabling is prohibitive. Current telephone wiring connections, which consist of copper twisted-pair media, were not originally designed to support the data rates or bandwidth required for interactive services such as video on demand or even high speed internet connections. Asymmetric Digital Subscriber Line (ADSL) technology has been developed to increase the effective bandwidth of existing twisted-pair connections, allowing interactive services to be provided without requiring the installation of fiber optic cable.

Discrete multi-tone (DMT) is a multi-carrier technique which divides the available bandwidth of twisted-pair copper media connections into mini-subchannels or bins. The DMT technique has been adopted in the ANSI T1.413 standard (ADSL standard). In the ADSL standard, DMT is used to generate 250 separate 4.3125 kilohertz subchannels from 26 kilohertz to 1.1 megahertz for downstream transmission to an end user. Likewise, DMT is used to generate 26 subchannels from 26 kilohertz to 138 kilohertz for upstream transmission by an end user. The asymmetric transmission protocol implemented by the ADSL standard requires a higher rate of data transmission from a central office to a remote terminal and a lower rate of data transmission from a remote terminal to a central office. As a result, different processing sequences are required at the remote terminal and central office ends. Currently available systems utilize printed circuit board designs which are configured to operate as either a central office end or a remote terminal end and may not be used interchangeably as an opposite end. Thus, because such separate system designs are necessary, these separate systems must include separate design overhead, separate data bases and separate firmware files. Furthermore, each of the separate data bases, separate designs, and separate firmware files must all be designed, produced, and maintained with finite resources.

DETAILED DESCRIPTION OF THE DRAWINGS

Figure 1:
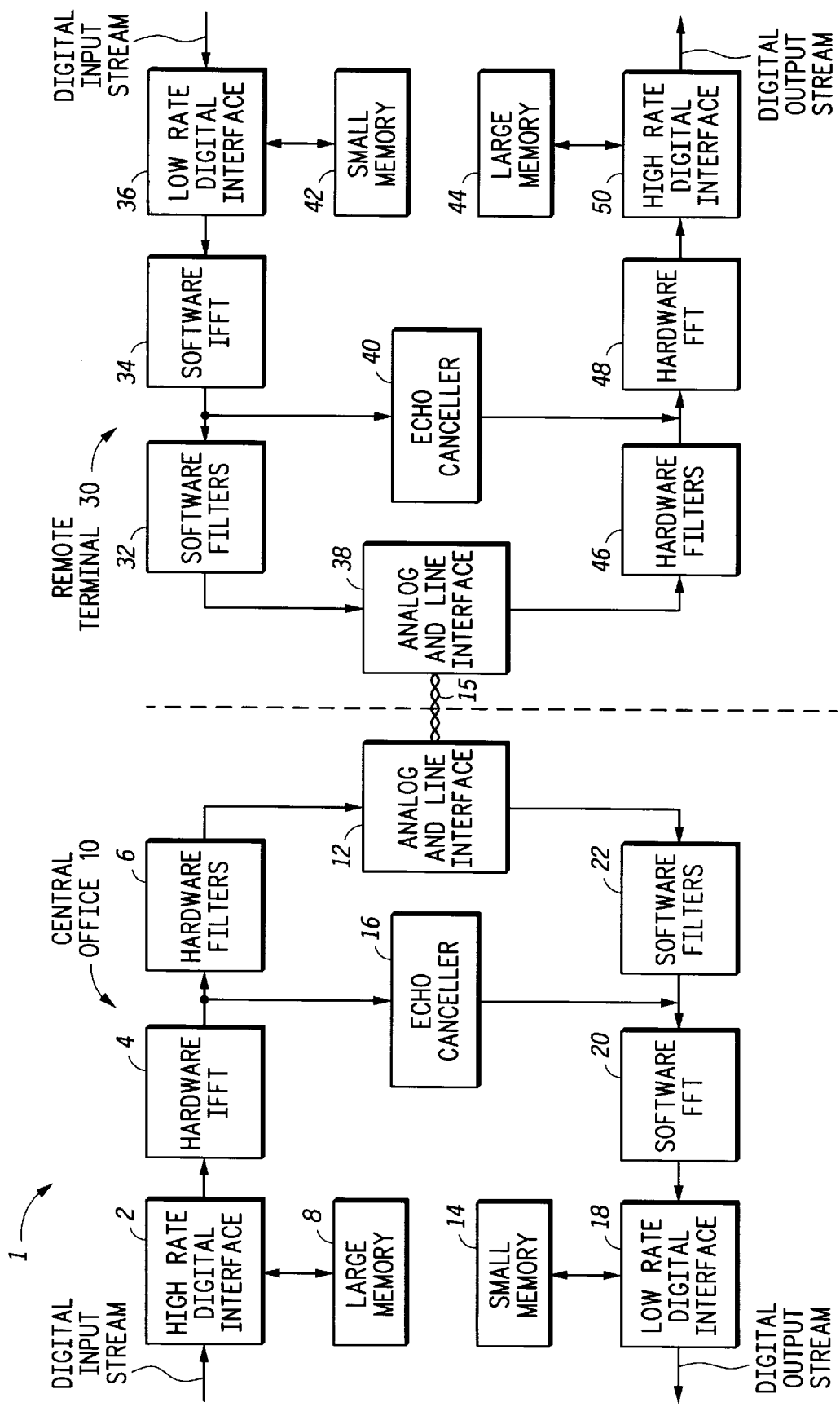
FIG. 1 illustrates, in block diagram form, an Asymmetric Digital Subscriber Line (ADSL) system in accordance with the present invention.

According to the present invention, an ADSL transceiver includes a flexible architecture that allows the ADSL transceiver to be configured through software so that identical hardware blocks may be used to perform multiple tasks. Thus, the ADSL transceiver may be configured through software to operate as either a central office or a remote terminal without requiring a substantial amount of added circuitry. Therefore, although the ADSL standard requires that a transmission data rate at a remote terminal be significantly lower than a transmission data rate at the central office, the amount of processing that is performed at either the central office end or the remote terminal end is nearly identical. For example, when the central office end is processing data provided at a high rate in its transmit path, the remote terminal end is processing high rate data in its receive path. Similarly, when the remote terminal end is processing data provided at a low rate in its transmit path, the central office end is processing low rate data in its receive path. The ADSL transceiver recognizes that processing functions in the transmit and receive paths of each of the central office and remote terminal ends are similar in nature. Thus, hardware processing circuitry designed to accommodate data transmitted and received at higher data rates may also be used to handle data transmitted at lower rates. Stated another way, an ADSL transceiver according to the present invention recognizes that a particular processing function may be utilized in either a transmit or receive data path depending on whether the ADSL transceiver of the present invention is configured to be the central office or the remote terminal end.

In the illustrated embodiment, the transceiver architecture is designed using a digital signal processor (DSP) core. It should be noted however that other types of processor cores could also be implemented. According to the present invention, peripheral modules, or processing elements, of the transceiver communicate with the DSP processor and are implemented as peripheral modules to the DSP processor. The DSP processor may access each of the peripheral modules through a standard memory read/write operation or through one of six programmable DMA channels. The DSP processor core may be implemented as a core of an DSP56301 single chip DSP, which is available from Motorola, Inc., of Austin, Tex.

One of the peripheral modules of the transceiver is a host processor interface which allows an external user to issue commands to configure the transceiver for operation as either the central office or the remote terminal. Furthermore, the host interface may also be accessed by the DSP processor core. It should be noted that the firmware required for performing processing tasks associated with both the central office and remote terminal is resident on the single-chip transceiver implementation of the present invention. The use of both firmware and the recognition that hardware resources may be reused allows an ADSL transceiver according to the present invention to selectively transfer data between the hardware resources and allows memory associated with the transceiver to comply with the standard set forth in the ADSL standard.

As previously mentioned, the peripheral modules of the transceiver are designed to be configurable by the DSP processor core to process tasks as either the central office or the remote terminal. One such peripheral module, a digital interface, must be able to communicate data at both a high rate and a low rate. For a high rate data path, large memories are required for frame and constellation buffers used therein. Small memories are adequate to handle the status storage in a low rate data path. Therefore, the digital interface of the present invention includes a single large memory and a single small memory for a frame buffer, and another large memory and a small memory for the constellation buffer. When at the central office, the digital interface peripheral is configured to have the large memories in the transmit path and the small memories in the receive path. At the remote terminal, the configuration is reversed. A more detailed description of operation of the digital interface peripheral will subsequently be provided.

In addition to the digital interface, a hardware fast Fourier transform (FFT) module is designed to be able to perform both a fast Fourier transform operation and an inverse fast Fourier transform operation. When the transceiver of the present invention is designed to operate as a central office, it is placed in the transmit path and is configured to perform an inverse fast Fourier transform operation. When the transceiver of the present invention is configured to operate as a remote terminal, the transceiver is placed in the receive path and is configured to perform a fast Fourier transform operation. The operation of the FFT module will subsequently be described in greater detail.

Another peripheral module is a time domain equalizer (TEQ) module. The TEQ module includes a general finite impulse response (FIR) filter followed by a biquadratic (biquad) infinite impulse response (IIR) filter stage. Each of these filters may be set to perform a desired filter operation depending on the use of the transceiver as either a central office or a remote terminal. The operation of these filters may be modified by changing the filter coefficients which are downloaded by the DSP processor core. At the central office, TEQ filter hardware is placed in the transmit path and the FIR filter is configured to perform roll off compensation for the interpolating filter that follows and the IIR filter is configured to operate as a high-pass filter. At the remote terminal end, the TEQ hardware is placed in the receive path, the FIR filter is configured to perform a channel shortening function (time-domain equalization), and the IIR is configured to operate as a high-pass POTS (plain old telephone system) filter. Again, operation of the TEQ module will subsequently be described in greater detail.

The transceiver also implements a circular echo synthesis (CES) module whose function is modified in response to whether the transceiver is configured to a central office or a remote terminal. The CES module resides between the transmit and receive paths of a single transceiver and performs the same algorithm at both the central office and the remote terminal. However, the CES module may be configured by the DSP processor core to interpolate its input data when it is provided at the remote terminal or to decimate its output data when it is provided at the central office to match the asymmetric data transmission rates specified in the ADSL standard. Operation and configuration of the CES module will subsequently be described in greater detail.

The present invention also implements an analog circuit which provides similar data conversion signal conditioning and line interface functions at both the central office and the remote terminal. Each of the analog functions described above is software configurable to handle differing signaling characteristics at both the central office and remote terminal ends. Operation of the analog module will subsequently be described in greater detail.

In the prior and subsequent descriptions, the term software and firmware are used. It is understood that for the purposes of this discussion the terms software, and firmware are used interchangeably.

Connectivity of the Embodiment

In the following description of the connectivity of the present invention, the term "bus" will be used to refer to a plurality of signals or conductors which may be used to transfer one or more various types of information, such as data, addresses, control, or status. The terms "assert" and "negate" will be used in referring to the rendering of a signal, status bin, or similar apparatus into its logically true or logically false state respectively. If the logically true state is a logic level one, the logically false state will be a logic level zero. And, if the logically true state is a logic level zero, the logically false state will be a logic level one. Furthermore, the symbol "$" preceding a number indicates that the number is represented in its hexadecimal or base 16 form. The symbol "%" preceding a number indicates that the number is represented in its binary or base 2 form.

FIG. 1 illustrates an ADSL communication system 1. ADSL system 1 includes a central office 10 and a remote terminal 30 which are connected together via a twisted pair of copper wires forming a telephone line 15. Central office 10 includes a high rate digital interface 2, a hardware IFFT (Inverse Fast Fourier Transform) 4, a hardware filters block 6, a large memory 8, an analog and line interface 12, a small memory 14, an echo canceller 16, a low rate digital interface 18, a software FFT (Fast Fourier Transform) 20, and a software filter 22. In central office 10, high rate digital interface 2 receives a digital input stream. High rate digital interface 2 is bidirectionally coupled to large memory 8 and transfers information to hardware IFFT 4. Hardware IFFT 4 has an output coupled to each of hardware filters block 6 and echo canceller 16. Hardware filters block 6 has an output coupled to analog and line interface 12. Analog and line interface 12 is bidirectionally coupled to telephone line 15, and has an output coupled to software filters 22. Both echo canceller 16 and software filters 22 have outputs coupled to an input of software FFT 20. Software FFT 20 has an output coupled to low rate digital interface 18. Low rate digital interface 18 is bidirectionally coupled to small memory 14, and has an output for providing a digital output stream.

Remote terminal 30 includes a software filters block 32, a software inverse fast Fourier transform (IFFT) 34, a low rate digital interface 36, an analog and line interface 38, an echo canceller 40, a small memory 42, a large memory 44, a hardware filters block 46, a hardware fast Fourier transform (FFT) 48, and a high rate digital interface 50. Low rate digital interface 36 receives a DIGITAL INPUT STREAM. In remote terminal 30, low rate digital interface 36 is bidirectionally coupled to small memory 42, and has an output coupled to software IFFT 34. Software IFFT 34 has an output coupled to both the software filters 32 and echo canceller 40. Software filters block 32 has an output coupled to analog and line interface 38. Analog and line interface 38 is bidirectionally coupled to telephone line 15 and has an output coupled to hardware filters block 46. Both echo canceller 40 and hardware filters block 46 are coupled to an input of hardware FFT 48. Hardware FFT 48 has an output coupled to high rate digital interface 50. High rate digital interface 50 is bidirectionally coupled to large memory 44. High rate digital interface 50 provides a DIGITAL OUTPUT STREAM.

Figure 2:
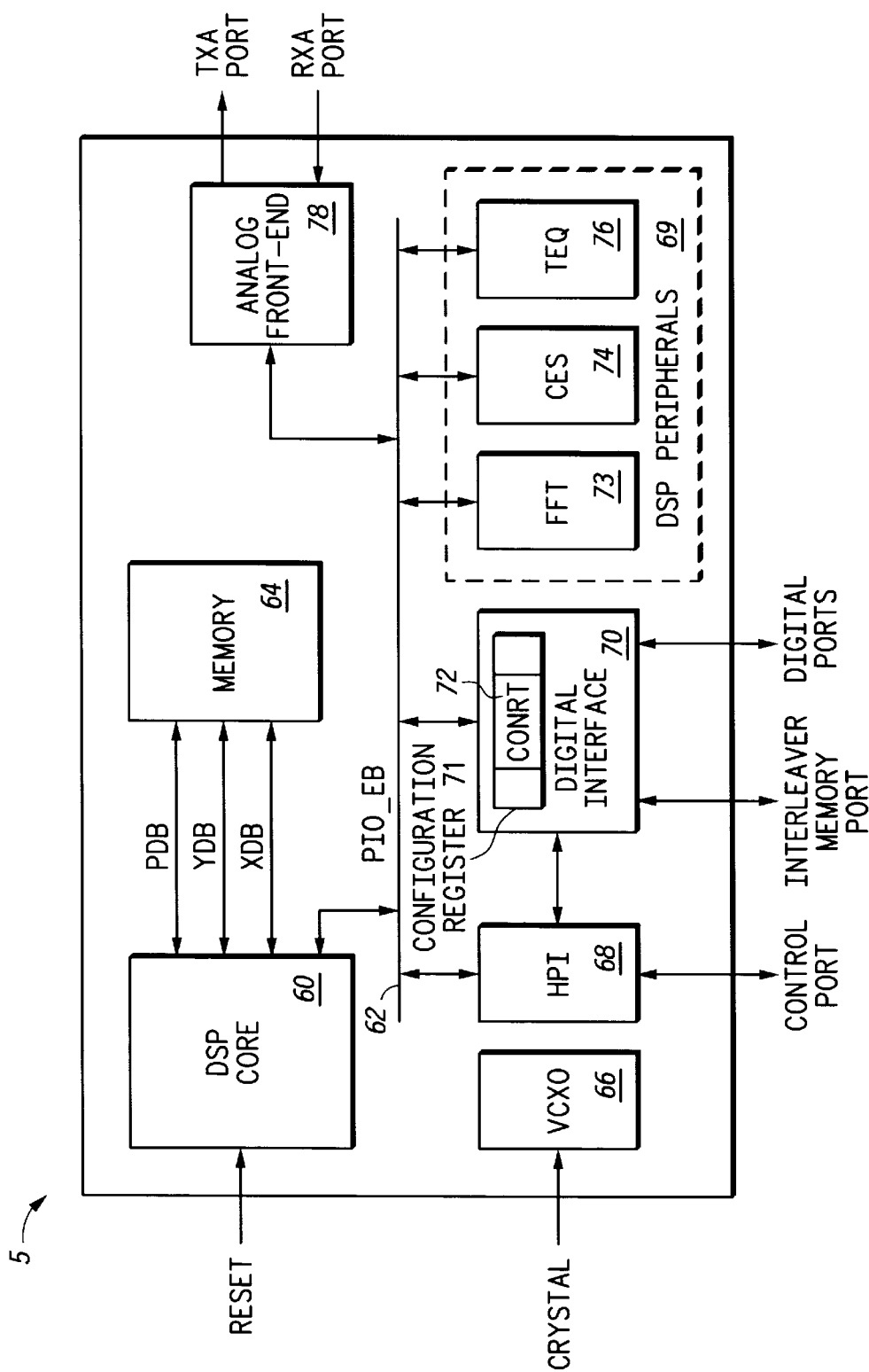
FIG. 2 illustrates, in block diagram form, an ADSL transceiver in accordance with the present invention.

FIG. 2 illustrates an ADSL transceiver 5 in accordance with the present invention. ADSL transceiver 5 is a single integrated circuit which includes a DSP core 60, a memory 64, a voltage controlled oscillator (VCXO) 66, a host processor interface (HPI) 68, a plurality of DSP peripherals 69, a digital interface 70, and an analog front-end (AFE) 78. Note the terms "analog front end" and "analog and line interface" are used interchangeably in this specification. Digital interface 70 includes a configuration register 71 storing a control bit 72 labeled "CONRT". DSP peripherals 69 are hardware peripherals including a fast Fourier transform (FFT) module 73, a circular echo synthesis (CES) module 74, and a time domain equalizer (TEQ) module 76.

DSP core 60 has an input terminal for receiving a reset signal labeled "RESET". DSP core 60 is bidirectionally coupled to memory 64 via three dedicated buses labeled "PDB", "YDB", and "XDB". DSP core 60 is also bidirectionally coupled to a peripheral bus labeled "PIO_EB" bus 62. VCXO 66 has an input terminal for connection to a crystal and receives a signal labeled "CRYSTAL" thereon. HPI 68 bidirectionally communicates with an external host processor via a port labeled "CONTROL PORT" and bidirectionally communicates with digital interface 70. Digital interface 70 bidirectionally communicates with external memory via a port labeled "INTERLEAVER MEMORY PORT" and additional ports which supply or receive labeled "DIGITAL PORTS". DSP core 60 bidirectionally communicates with HPI 68, digital interface 70, FFT module 73, CES module 74, TEQ module 76, and analog front-end 78 via PIO_EB bus 62. Analog front-end 78 provides information via a signal labeled "TXA PORT" and receives information via a signal labeled "RXA PORT".

Figure 3:
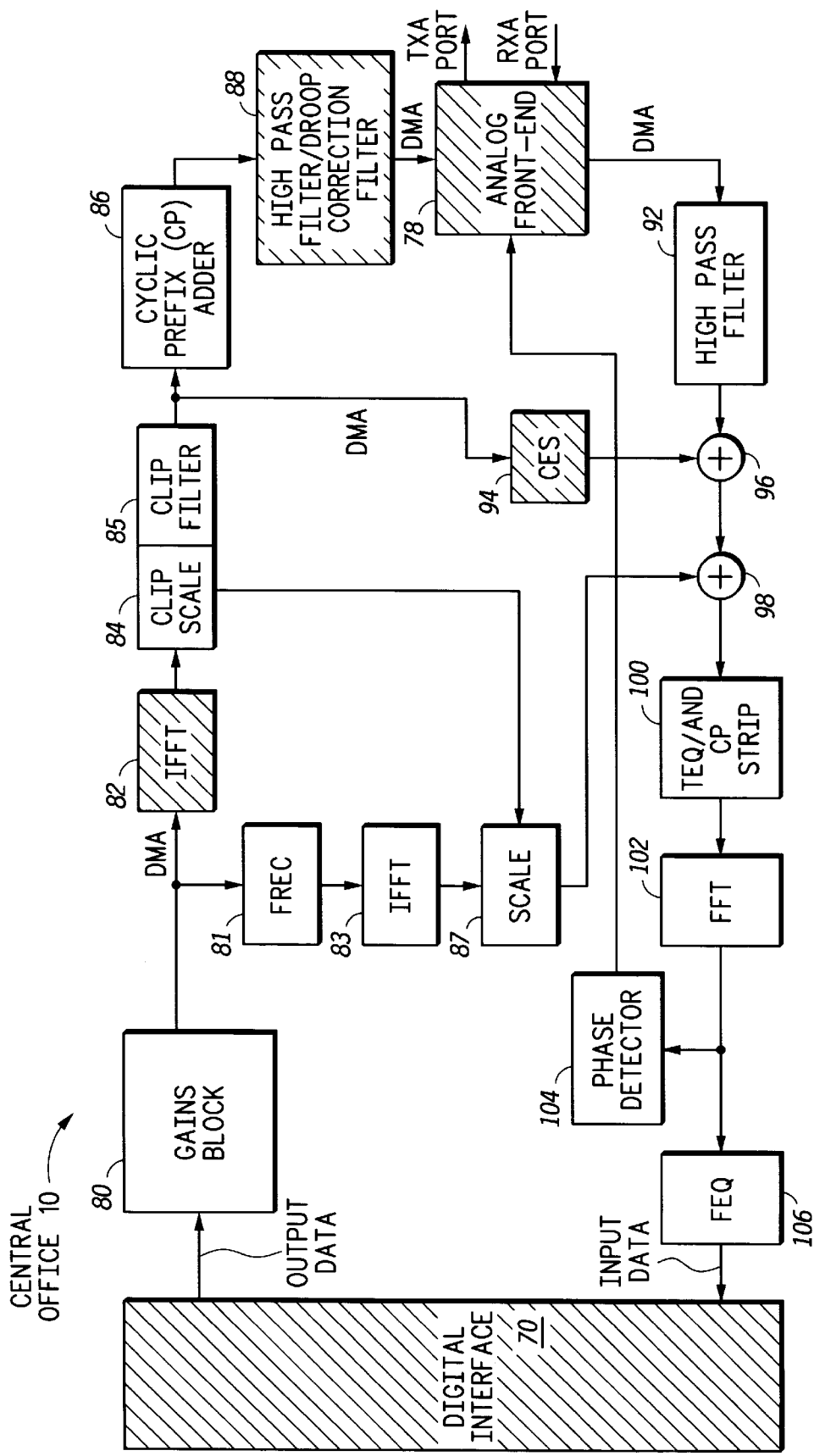
FIG. 3 illustrates, in partial block and partial logic diagram form, the ADSL transceiver of FIG. 2 configured to operate at a central office.

FIG. 3 illustrates, in block diagram form, a configuration of ADSL transceiver 5 when operating as central office 10. When configured as central office 10, ADSL transceiver 5 comprises a digital interface 70, a gains block 80, an inverse fast Fourier transform (IFFT) 82, a clip scale 84, a clip filter 85, cyclic prefix (CP) adder 86, a high pass filter/droop correction filter 88, an analog front-end 78, a high pass filter 92, a circular echo synthesis (CES) module 94, an adder 96, an adder 98, a time domain equalizer (TEQ) module 100, a fast Fourier transform (FFT) module 102, a phase detector 104, and a frequency domain equalizer (FEQ) 106. Central office 10 also comprises a FREC 81, an IFFT 83, and a scale 87.

Digital interface 70 has an output coupled to gains block 80 to provide a signal labeled "OUTPUT DATA". Gains block 80 has an output coupled to IFFT 82 and FREC 81. FREC 81 has an output coupled to IFFT 83. IFFT 83 has an output coupled to scale 87. Scale 87 has an output coupled to adder 98. IFFT 82 has an output coupled to clip scale 84 and clip filter 85. IFFT 82 is coupled to clip scale 84 to implement an IFFT scale factor. Clip scale 84 is coupled to scale 87. An output of clip filter 85 is coupled to cyclic prefix adder 86 and CES module 94. Cyclic prefix (CP) adder 86 has an output coupled to high pass filter/droop correction filter 88. High pass filter/droop correction filter 88 has an output coupled to analog front-end 78. Analog front-end 78 has an input for receiving a signal labelled "RXA PORT", an output for providing a signal labeled "TXA PORT", and an output coupled to high pass filter 92. High pass filter 92 has an output coupled to adder 96. CES module 94 has an output coupled to adder 96. Adder 96 has an output coupled to adder 98. Adder 98 has an output coupled to TEQ/CP strip module 100. TEQ module 100 has an output coupled to FFT module 102. FFT module 102 has an output coupled to both FEQ 106 and phase detector 104. Phase detector 104 has an output coupled to analog front-end 78. FEQ 106 has an output coupled to digital interface 70 providing a signal labeled "INPUT DATA".

Figure 4:
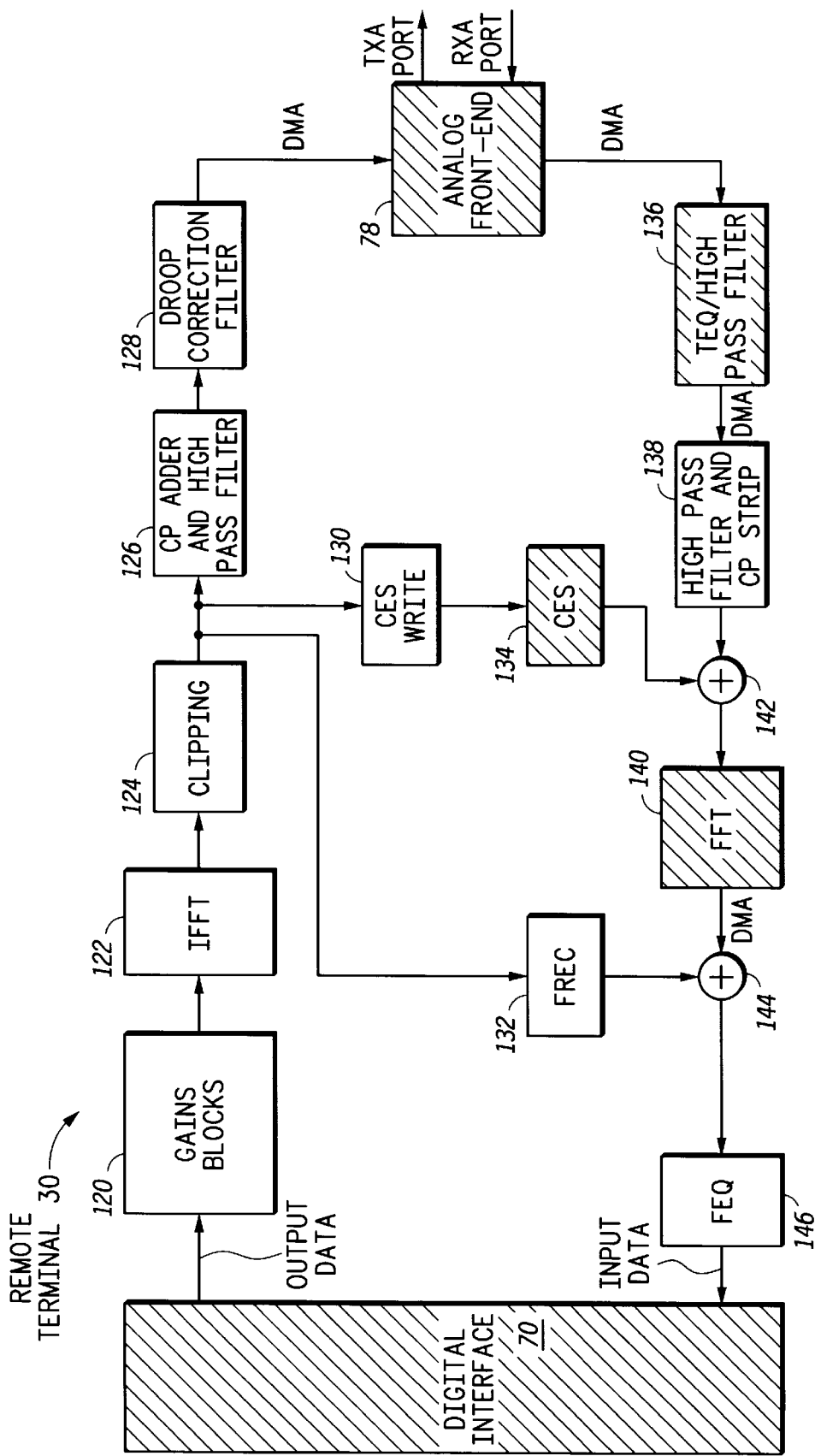
FIG. 4 illustrates, in partial block and partial logic diagram form, the ADSL transceiver of FIG. 2 configured to operate at a remote terminal.

FIG. 4 illustrates ADSL transceiver 5 configured to operate as a remote terminal 30. Remote terminal 30 comprises a digital interface 70, a gains block 120, an inverse fast Fourier transform (IFFT) module 122, a clipping block 124, a CP adder and high pass filter 126, a droop correction filter 128, a circular echo synthesis (CES) write 130, an FREC 132, a circular echo synthesis (CES) module 134, an analog front-end 78, a time domain equalization (TEQ)/high pass filter module 136, a high pass filter and CP stripper 138, adder 142, a fast Fourier transform (FFT) module 140, adder 144, and frequency domain equalizer (FEQ) 146.

Digital interface 70 has an output coupled to gains block 120 to provide the OUTPUT DATA signal. Gains block 120 has an output coupled to IFFT module 122. IFFT module 122 has an output coupled to clipping block 124. Clipping block 124 has an output coupled to FREC 132, CES write 130, and cycle prefix (CP) adder and high pass filter 126. CP adder and high pass filter 126 has an output coupled to droop correction filter 128. Droop correction filter 128 has an output coupled to analog front-end 78. Analog front-end 78 has an input for receiving the RXA PORT signal, an output for providing the TXA PORT signal, and an output coupled to TEQ/high pass filter module 136. TEQ/high pass filter module 136 has an output coupled to high pass filter and CP strip 138. High pass filter and CP stripper 138 has an output coupled to adder 142. CES write 130 has an output coupled to CES module 134. CES module 134 has an output coupled to adder 142. Adder 142 has an output coupled to FFT module 140. FFT module 140 has an output coupled to adder 144. FREC 132 has an output coupled to adder 144. Adder 144 has an output coupled FEQ 146. FEQ 146 has an output coupled to digital interface 70 to provide an INPUT DATA signal.

Figure 5:
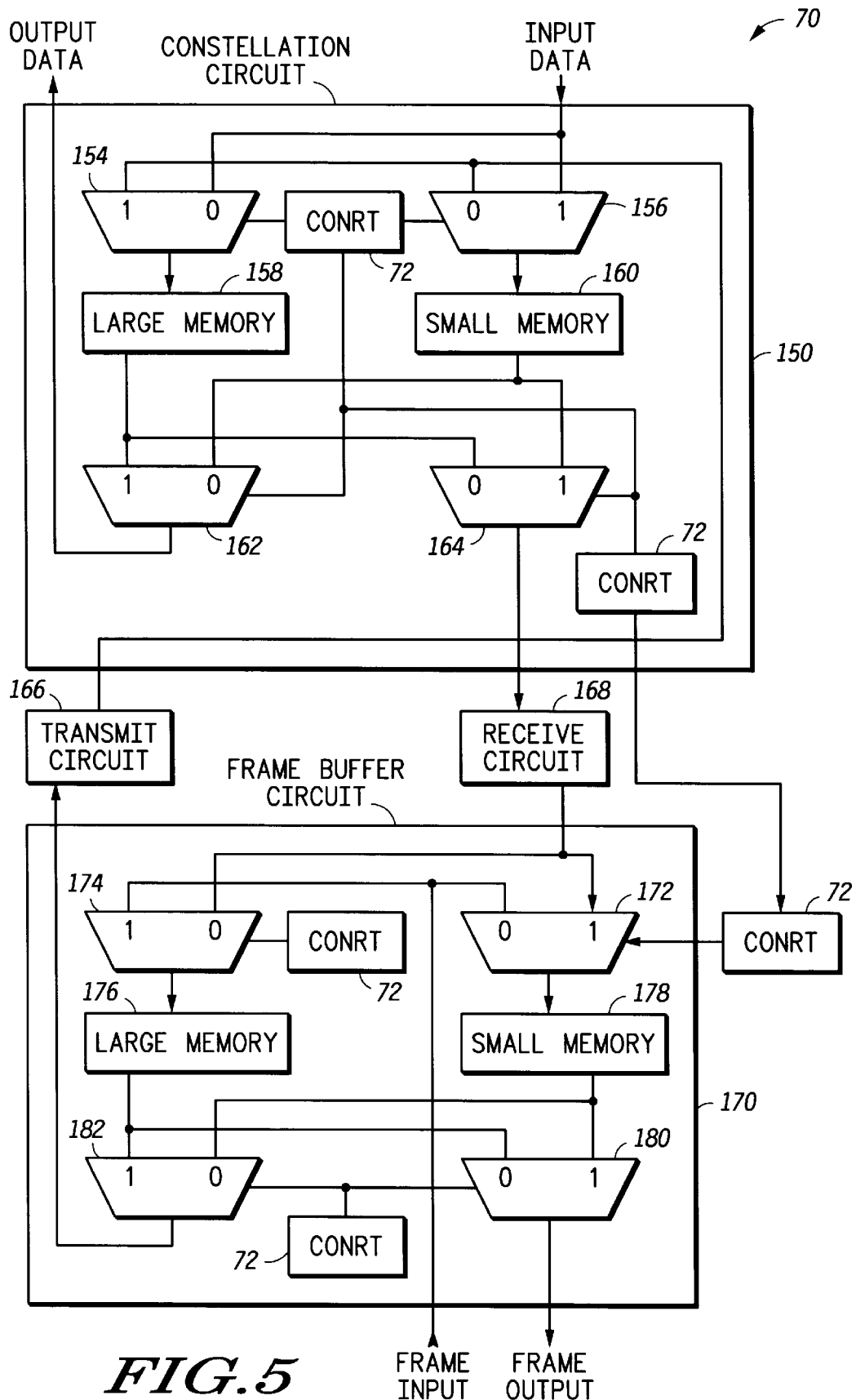
FIG. 5 illustrates, in block diagram form, the digital interface of the ADSL transceiver of FIG. 2.

FIG. 5 illustrates digital interface 70 in greater detail. Digital interface 70 generally includes a constellation circuit 150, a transmit circuit 166, a receive circuit 168, and a frame buffer circuit 170. Constellation circuit 150 includes a CONRT bit 72, a multiplexer 156, a multiplexer 154, a large memory 158, a small memory 160, multiplexer 162, and a multiplexer 164. Frame buffer circuit 170 comprises a multiplexer 172, a multiplexer 174, a large memory 176, a small memory 178, a multiplexer 180, and a multiplexer 182.

The INPUT DATA signal is provided to a first input of multiplexer 156 and a first input of multiplexer 154. An output of transmit circuit 166 is coupled to a second input of each of multiplexers 154 and 156. CONRT bit 72 is coupled to an enable input of multiplexer 154, multiplexer 156, multiplexer 162, multiplexer 164, multiplexer 172, multiplexer 174, multiplexer 180, and multiplexer 182. An output of multiplexer 156 is coupled to small memory 160. An output of small memory 160 is coupled to a first input of each of multiplexers 162 and 164. An output of multiplexer 154 is coupled to large memory 158. Large memory 158 has an output coupled to a second input of each of multiplexers 162 and 164. An output of multiplexer 162 provides the OUTPUT DATA signal. An output of multiplexer 164 is coupled to receive circuit 168. Receive circuit 168 is coupled to a first input of each of multiplexers 172 and 174. A FRAME INPUT signal is provided to a second input of each of multiplexers 172 and 174. An output of multiplexer 172 is coupled to small memory 178. An output of multiplexer 174 is coupled to large memory 176. An output of small memory 178 is coupled to a first input of each of multiplexers 180 and 182. An output of large memory 176 is coupled to a second input of multiplexers 180 and 182. The output of multiplexer 182 is coupled to transmit circuit 166. An output of multiplexer 180 provides a FRAME OUTPUT signal.

Figure 6:
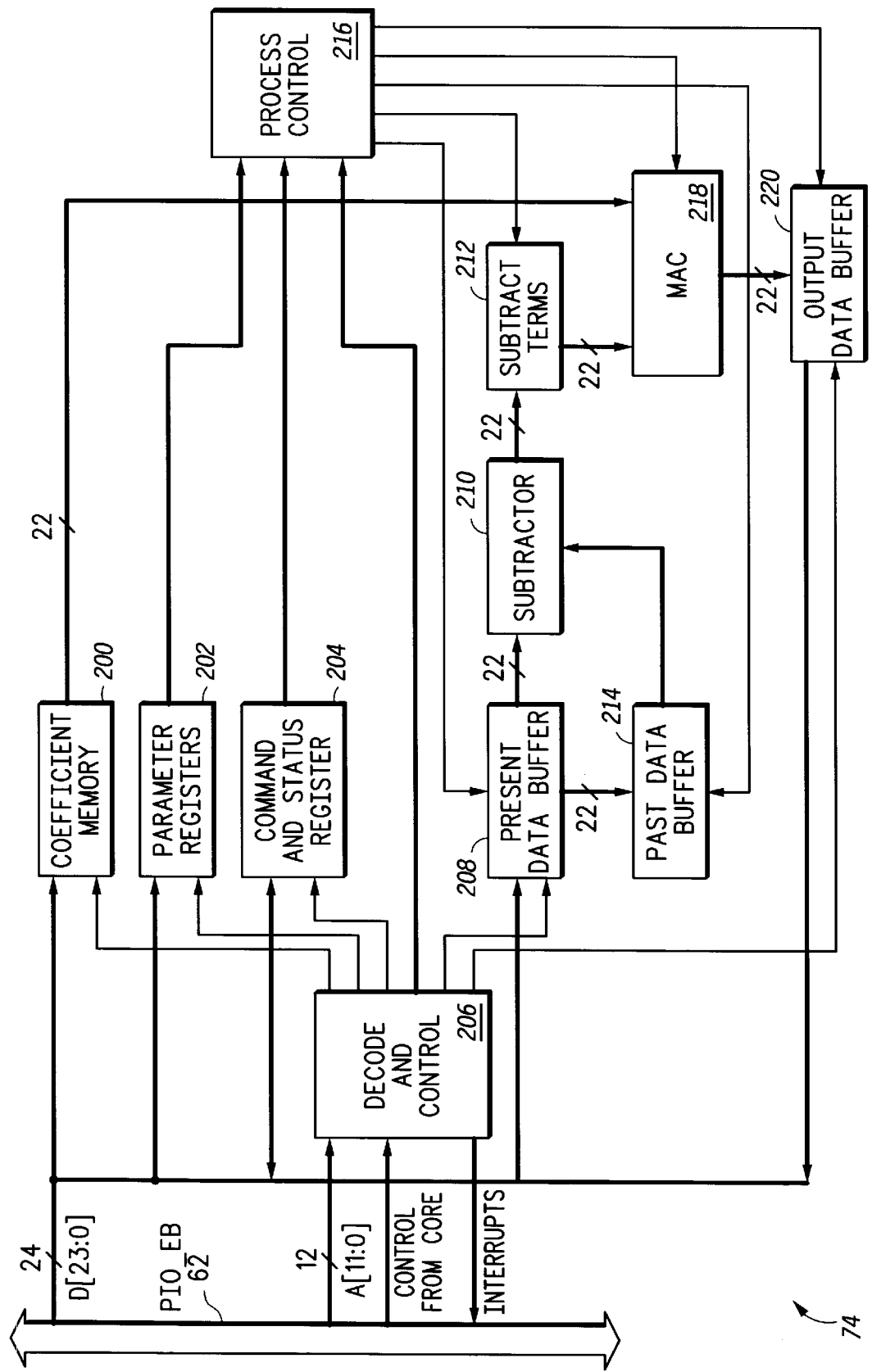
FIG. 6 illustrates, in block diagram form, the circular echo synthesis module of the ADSL transceiver of FIG. 2.

FIG. 6 illustrates circular echo synthesis (CES) module 74 in greater detail. CES module 74 includes a coefficient memory 200, a parameter registers portion 202, a command and status register 204, a decode and control circuit 206, a present data buffer 208, a subtractor 210, a subtract terms buffer 212, a past data buffer 214, a process control circuit 216, a multiply and accumulate circuit (MAC) 218, and an output data buffer 220.

PIO_EB bus 62 is coupled to coefficient memory 200, parameter registers portion 202, command and status register 204, decode and control circuit 206, present data buffer 208 and output data buffer 220. Coefficient memory 200 has an output coupled to MAC 218. Decode and control circuit 206 has an output coupled to each of coefficient memory 200, parameter registers portion 202, command and status register 204, present data buffer 208, and output data buffer 220. Parameter registers portion 202 has an output coupled to process control circuit 216. Command and status register 204 has an output coupled to process control circuit 216. Decode and control circuit 206 has an output coupled to process control circuit 216. Process control circuit 216 has an output coupled to present data buffer 208. Present data buffer 208 has an output coupled to past data buffer 214 and subtractor 210. Subtractor 210 has an output coupled to subtract terms buffer 212. Process control circuit 216 has an output coupled to subtract terms buffer 212 and past data buffer 214. Subtract terms buffer 212 has an output coupled to MAC 218, and has an output coupled to output data buffer 220. Process control circuit 216 has an output coupled to MAC 218. MAC 218 is coupled to output data buffer 220. Process control circuit 216 has an output coupled to output data buffer 220.

Figure 7:
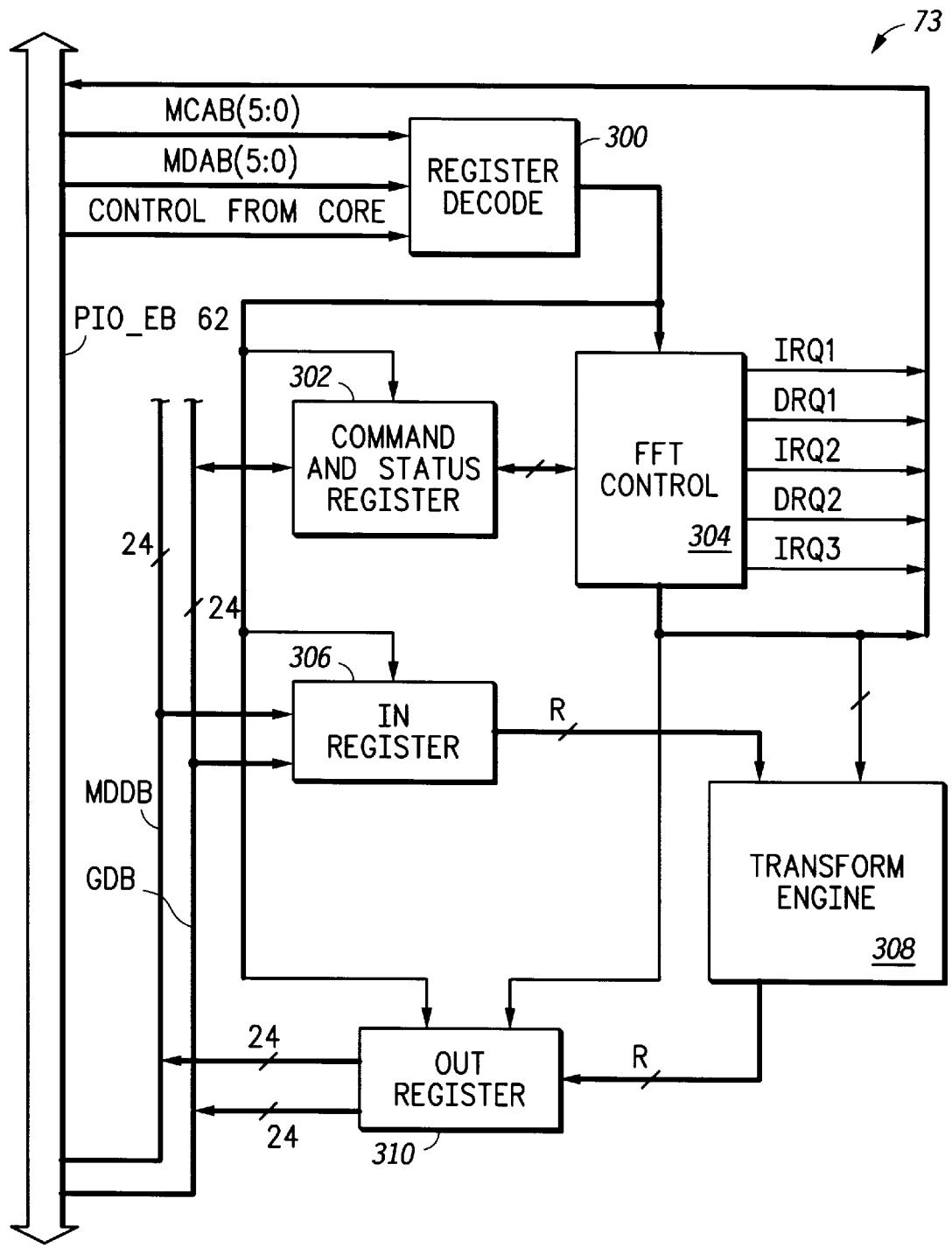
FIG. 7 illustrates, in block diagram form, the fast Fourier transform module of the ADSL transceiver of the present invention.

FIG. 7 illustrates fast Fourier transform (FFT) module 73 in greater detail. FFT module 73 comprises a register decode circuit 300, a command and status register 302, an FFT control circuit 304, an IN register 306, a transform engine 308, and an out register 310. PIO_EB bus 62 is coupled to register decode circuit 300, command and status register 302, IN register 306, and out register 310. Register decode circuit 300 has an output coupled to command and status register 302, FFT control circuit 304, IN register 306, and out register 310. A plurality of outputs of FFT control circuit 304 are coupled to PIO_EB bus 62. IN register 306 has an output coupled to transform engine 308. FFT control circuit 304 has an output coupled to out register 310 and transform engine 308. Transform engine 308 has an output coupled to out register 310.

Figure 8:
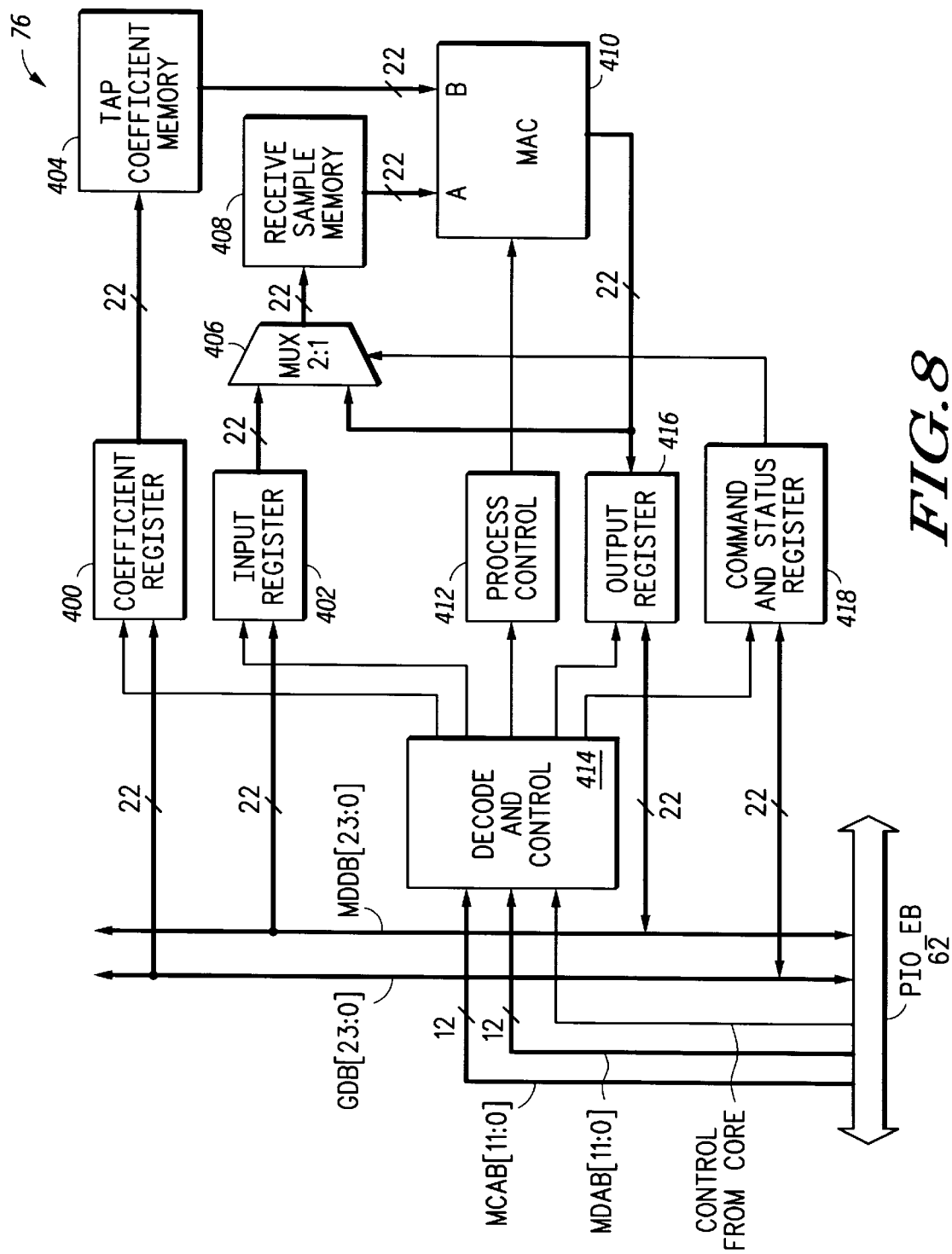
FIG. 8 illustrates, in block diagram form, the time domain equalization module of the ADSL transceiver of the present invention.

FIG. 8 illustrates time domain equalization (TEQ) module 76 in greater detail. TEQ module 76 comprises a coefficient register 400, an input register 402, a tap coefficient memory 404, a multiplexer (MUX) 406, a receive sample memory 408, a multiply-accumulate circuit (MAC) 410, a process control circuit 412, a decode and control circuit 414, output register 416, and a command and status register 418. PIO_EB bus 62 is coupled to each of coefficient register 400, input register 402, decode and control circuit 414, output register 416, and command and status register 418. Coefficient register 400 has an output coupled to tap coefficient memory 404. Tap coefficient memory 404 has an output coupled to a first input of MAC 410. Decode and control circuit 414 has outputs coupled to coefficient register 400, input register 402, process control circuit 412, output register 416, and command and status register 418. Input register 402 is coupled to MUX 406. Process control circuit 412 has an output coupled to MAC 410. Command and status register 418 has an output coupled to MUX 406, and output register 416. MAC 410 has an output coupled to MUX 406. MUX 406 has an output coupled to receive sample memory 408. Receive sample memory 408 has an output coupled to a second input of MAC 410.

Figure 9:
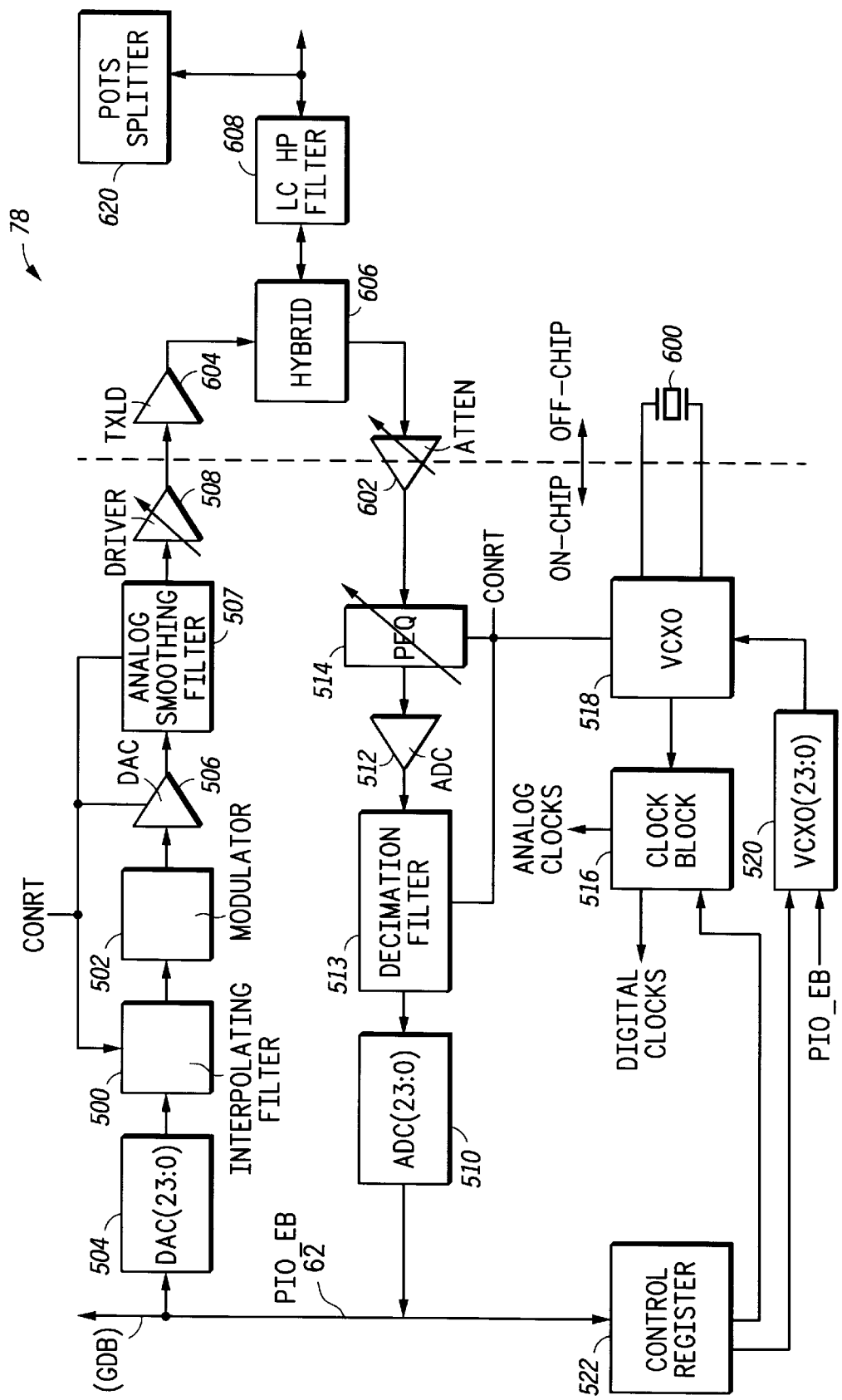
FIG. 9 illustrates, in block diagram form, the analog front-end of the ADSL transceiver of the present invention.

FIG. 9 illustrates, in block diagram form, analog front-end 78 of FIG. 2. Analog front-end 78 includes a register 504, an interpolating filter 500, a modulator 502, a digital-to-analog converter (DAC) 506, an analog smoothing filter 507, a driver 508, a programmable equalizer (PEQ) 514, an analog-to-digital converter (ADC) 512, a decimation filter 513, a register 510, a voltage controlled oscillator (VCXO) 518, a clock block 516, and a register 520. Additionally, analog front-end 78 is coupled to an external circuit comprising an external line driver labeled "TXLD" 604, a hybrid circuit 606, an attenuator 602, a crystal 600, an inductor-capacitor high pass (LC HP) filter 608, and a POTS splitter 620.

PIO_EB bus 62 is coupled to registers 504, 510 and 520. PIO_EB bus 62 is also coupled to control register 522. Register 504 has an output coupled to an interpolating filter 500. Interpolating filter 500 has an output coupled to modulator 502. Modulator 502 has an output coupled to DAC 506. DAC 506 has an output coupled to analog smoothing filter 507. Analog smoothing filter 507 has an output coupled to driver 508. Driver 508 has an output coupled to TXLD 604. TXLD 604 has an output coupled to hybrid circuit 606. Hybrid circuit 606 is bidirectionally coupled to LC HP filter 608. LC HP filter 608 is bidirectionally coupled to POTS splitter 620. Hybrid circuit 606 also has an output coupled to attenuator 602. Attenuator 602 has an output coupled to PEQ 514 of AFE 78. PEQ 514 has an output coupled to ADC 512. ADC 512 has an output coupled to decimation filter 513. Decimation filter 513 has an output coupled to register 510. Control register 522 has an output coupled to VCXO register 520 and clock block 516. VCXO register 520 has an output coupled to VCXO 518. VCXO 518 is coupled to clock block 516, and crystal 600. Clock block 516 has outputs for providing clocks to analog and digital components labeled "ANALOG CLOCKS" and "DIGITAL CLOCKS", respectively.

DESCRIPTION OF OPERATION

Referring to FIG. 1, ADSL system 1 illustrates the required configuration for each of central office 10 and remote terminal 30. As previously mentioned, when central office 10 is processing data transmitted at a high rate in its transmit path, remote terminal 30 is processing high rate data in its receive path. Similarly, when remote terminal 30 is processing data transmitted at a low rate in its transmit path, central office 10 is processing low rate data in its receive path. As functions implemented in hardware are typically executed more quickly than those implemented in software, for optimal speed, central office 10 implements selected functions in its transmit path in hardware when it is transmitting data at a high rate. Similarly, remote terminal 30 will implement functions in its receive path in hardware when it is receiving data transmitted at a high data rate. When remote terminal 30 is transmitting data at a lower rate, the functions to be executed in the transmit path may be implemented in software. As well, central office 10 may also implement functions in its receive path in software when data is provided at a lower data rate by remote terminal 30. The use of hardware functions on data paths having high transfer rates and software functions on data paths having lower data transfer rates is illustrated in FIG. 1. There, the desired implementation of central office 10 and remote terminal 30 are illustrated.

According to the present invention, a single ADSL transceiver 5 provides a flexible and configurable circuit which may be programmed to operate as either central office 10 or remote terminal 30 (as illustrated in FIG. 1). ADSL transceiver 5 provides hardware processing resources whose inputs and outputs may be selectively configured by a user to implement either central office 10 or remote terminal 30 in an efficient manner. Stated another way, ADSL transceiver 5 may be selectively configured as either a central office 10 or a remote terminal 30 and is not required to be exclusively one or the other. This selectivity allows a single integrated circuit to be designed and manufactured for both CO and RT equipment.

FIG. 2 illustrates ADSL transceiver 5 in greater detail. DSP core 60 accesses each of a plurality of transceiver peripheral modules via PIO_EB bus 62. The plurality of peripheral modules include host processor interface (HPI) 68, digital interface 70, FFT module 73, CES module 74, TEQ module 76, and analog front-end 78. It should be noted that peripherals having additional functionality may be added as needed and the present invention is not limited to the particular peripheral modules disclosed herein. DSP core 60 accesses each peripheral module through a standard memory read/write operation or through one of six programmable DMA channels. The DMA channels may be selectively programmed to access each of the plurality of peripheral modules in a different order as required by the configuration of ADSL transceiver 5 as central office 10 or as remote terminal 30. HPI 68 allows an external user to issue commands to configure transceiver 5 as either central office 10 or remote terminal 30. Once the user has configured ADSL transceiver 5 to function as either central office 10 or remote terminal 30, DSP core 60 selects the appropriate firmware for executing the desired function from memory 64 via the program data bus (PDB).

The manner by which transceiver 5 is selected to be CO or RT may be set by the user through HPI 68, or may be auto-configured via twisted pair signal 15 in the manner described in copending application attorney docket no. SC-90263A. In order to reconfigure transceiver 5 to operate as either CO or RT, it is necessary to drive a control signal to each affected module. In the illustrated embodiment, each affected module has a configuration register which stores the control bit for that module. In other embodiments, however, the transceiver may have a global configuration register which provides the same control signal to each affected module, or other appropriate means such as a dedicated pin. As an example, FIG. 2 illustrates configuration register 71 of digital interface 70. Configuration register 71 stores the CONRT control bit, which when set to a binary 1, indicates that digital interface 70 is to operate in central office equipment, and when set to binary 0, indicates that digital interface 70 is to operate in remote terminal equipment.

Assume the external user desires to configure ADSL transceiver 5 as central office 10. FIG. 3 illustrates this configuration in greater detail. It should be noted that in FIG. 3 all shaded blocks are implemented as hardware and all unshaded blocks are implemented as firmware. As previously mentioned, the firmware is stored in memory 64. Digital interface 70 receives a plurality of serial digital data streams via the plurality of digital ports. Digital interface 70 provides those functions which are responsible for data transport. Digital data may be transported on any one of a plurality of programmable bearer channels. The plurality of programmable bearer channels are multiplexed together in a data buffer where they are synchronized into an appropriate one of the plurality of programmable bearer channels as determined by the ADSL standard. The framed data is then subjected to various operations. The data resulting from these operations is provided to a constellation output buffer (not shown in detail herein) as a plurality of complex numbers representing DMT tones. The complex numbers are subsequently transferred via the OUTPUT DATA signal.

The OUTPUT DATA signal is provided to gains block 80. Gains block 80 represents firmware which multiplies the data values transferred via the OUTPUT DATA signal by a calculated gain value which was previously computed as the product of three separate values. A first value used to generate the calculated gain value is a constellation normalizing constant which scales a plurality of constellations so that they all have a same average energy. A second value is a fine adjustment gain which is computed during initialization as part of a bit-loading algorithm. A third value is an equalizer gain which appropriately scales the carriers of ADSL transceiver 5 to undo the ripple in an analog pass band. The constellation normalizing constant and the equalizer gain are known before initialization begins, and their product is used at all times. The fine adjustment gain is included in the gain value once steady state transmission has begun and is changed only if a bit swapping operation takes place.

Gains block 80 provides adjusted data to IFFT 82 via a DMA channel of DSP core 60. IFFT 82 corresponds to FFT module 73 of FIG. 2, configured as an inverse fast Fourier transform. IFFT 82 subsequently converts the adjusted data values from the frequency domain to the time domain. Together, clip scale 84 and clip filter 85 provide the necessary limiting of input data values to prevent overflow in subsequent operations. It should be noted that an IFFT scale factor must be provided to clip scale 84 to calculate the clip scale value. Cyclic prefix adder 86 adds a cyclic prefix to a frame of data currently being operated upon. The cyclic prefix includes the last 32 samples of the frame which is copied and placed at the beginning of the same frame. The resulting frame is stored in memory 64 of ADSL transceiver 5.

From cyclic prefix (CP) adder 86, the resulting frame is provided to High pass filter/Droop correction filter 88. Because ADSL transceiver 5 is functioning as a central office, the High pass filter/Droop correction filter 88 function is implemented by TEQ module 76 of FIG. 2, which receives data via the DMA and performs a high pass filter operation using a biquad filter as well as droop correction using an FIR filter. TEQ module 76 will subsequently be described in greater detail in conjunction with FIG. 8 below.

High pass filter/Droop correction filter 88 provides an output to analog front-end 78. This is accomplished via a third DMA channel of DSP core 60 which moves the results of the operations executed by TEQ module 76 to Analog front-end 78 which performs a filtering and a digital-to-analog conversion operation to provide an analog signal via the TXA PORT. It should be noted that when ADSL transceiver 5 is configured as central office 10, the ADSL standard requires that transceiver 5 transmit data to the remote terminal at a higher rate than the remote terminal transmits data back to the central office. Furthermore, it should be noted that because data is transmitted at the higher rate, where necessary, functions to be executed in the transmit path of central office 10 are implemented as hardware (as indicated by the shaded boxes).

Analog front-end 78 receives the analog RXA PORT signal. This analog signal is converted by an analog-to-digital converter and the resulting digital signal is transferred via a fourth DMA channel to memory 64. From there, transceiver 5 implements the remaining functions of central office 10 in firmware residing in memory 64. First, a high pass filter operation 92 is executed using firmware. Next, adder 96 preconditions a resulting signal for the subsequent echo cancellation operation. Adder 98 then removes an echo from the preconditioned signal. Subsequently, TEQ/CP strip module 100 performs time domain equalization, which shortens the response of the channel, and removes the cyclic prefix. FFT module 102 then performs a translation of the signal provided by TEQ module 100 from the time domain to the frequency domain. FEQ 106 subsequently performs frequency equalization on the resulting signal to generate the INPUT DATA signal. FEQ 106 is implemented to undo any magnitude and phase distortion the signal may have experienced in the channel. Digital interface 70 recovers digital data from the INPUT DATA signal which is further operated upon to provide data in a framed format. The framed data is subsequently demultiplexed and provided to each of the plurality of serial digital data outputs provided by the plurality of digital ports.

Transceiver 5 also implements a scheme for echo cancellation. FREC 81 receives the adjusted data provided by gains block 80 and creates an estimate of the echo in the frequency domain. IFFT 83 subsequently converts the estimate from the frequency domain to the time domain. Scale 87 then scales the time domain estimate of the echo to match the scaling done in the transmit path. Scale 87 provides an estimated echo value. CES module 94 receives data from clip filter 85 via one of the DMA channels of DSP 60. CES module 94 corresponds to CES module 74 of FIG. 2. CES module 94 removes the effect of interference in the echo signal. The cancellation value generated by CES module 94 is subsequently subtracted from a filtered receive signal provided by high pass filter 92. The estimated echo value provided by scale 87 is then subtracted using adder 98.

A signal generated by FFT module 102 is also provided to phase detector 104. Phase detector 104 derives timing information from a pilot tone of the receive signal. This information is then used to lock a sampling clock of the analog-to-digital and digital-to-analog converters in analog front-end 78.

FIG. 4 illustrates ADSL transceiver 5 configured to operate as remote terminal 30. When operating as remote terminal 30, digital interface 70 provides those functions which are responsible for data transport. Digital data may be transported on any one of a plurality of programmable bearer channels. The data values communicated by the plurality of programmable bearer channels are multiplexed together in a data buffer, and then synchronized into data transmission frames which comply with the ADSL standard. The framed data is then subject to various operations. The data resulting from these operations is provided in a constellation output buffer as complex numbers representing DMT tones. The complex numbers are subsequently provided to gains block 120.

Gains block 120 implements a similar function to gains block 80 of FIG. 3. Specifically, gains block 120 adjusts the complex numbers provided by the OUTPUT DATA to generate a plurality of adjusted gain values. The adjusted gain values are provided to IFFT module 122. It should be noted that IFFT module 122 is implemented in firmware whereas IFFT 82 of FIG. 3 is implemented in hardware. IFFT module 122 is implemented in firmware because when ADSL transceiver 5 is operating as remote terminal 30, the data rate at which it is required to transmit information is slow enough to implement the transfer function in software. IFFT module 122 converts the adjusted gain values from the frequency domain to the time domain.

Subsequently, the converted values are provided to clipping block 124. Clipping block 124 limits the output value to prevent overflow in subsequent operations. The limited values are then provided to CP adder and high pass filter 126 and prepended with a cyclic prefix (CP), and, unlike high pass filter/droop correction filter 88 of FIG. 3, high pass filter 126 is implemented in firmware. Again, high pass filter 126 is implemented in firmware rather than hardware because the data transmission rate required by remote terminal 30 is slow enough to allow for the use of firmware. The filtered values provided by high pass filter 126 are subsequently provided to droop correction filter 128. As with high pass filter 126, droop correction filter 128 is implemented as firmware rather than hardware because a lower data transmission rate is used. Droop correction filter 128 subsequently provides the corrected, filtered values to analog front-end 78 via a first DMA channel of DSP core 60. Analog front-end 78 performs a filtering operation and a digital-to-analog conversion operation to provide an analog signal via the TXA PORT.

An analog signal is provided to analog front-end 78 via an RXA PORT. Analog front-end 78 subsequently performs an analog-to-digital conversion and provides a digital signal to TEQ/high pass filter module 136 via a second DMA channel of DSP core 60. TEQ/high pass filter module 136 corresponds to TEQ module 76 of FIG. 2. TEQ/high pass filter module 136 performs a time domain equalization function to shorten a channel response of the digital input signal. TEQ/high pass filter module 136 also performs a high pass filter function. It should be noted that TEQ/high pass filter module 136 and the high pass filter function implemented therein are implemented in hardware because they are in the receive path of remote terminal 30. As previously discussed, the receive path of remote terminal 30 is required to receive data at a highest data transmission rate.

An output of TEQ/high pass filter module 136 is provided to DSP core 60 via a third DMA channel of DSP core 60. DSP core 60 performs a second high pass filter function in high pass filter 138 and stores a result in memory 64. High pass filter 138 is implemented in firmware. The output of high pass filter 138 is stripped of the cyclic prefix (CP) and provided to adder 142. A result of adder 142 is provided to FFT module 140. FFT module 140 performs a time domain to frequency domain conversion in hardware. It should be noted that FFT module 140 corresponds to FFT module 73 of FIG. 2. A result of the operation executed by FFT module 140 is provided to adder 144 via a fourth DMA channel of DSP core 60. An output of adder 144 is provided to FEQ 146 which corrects any magnitude and phase distortion the signal may have experienced in the channel. The output of FEQ 146 is then sent to digital interface 70. Digital interface 70 operates on the input data and provides it to a frame buffer. The data in the frame buffer is then demultiplexed into the plurality of digital data streams provided by the plurality of digital ports.

As with central office 10, remote terminal 30 implements an echo cancellation scheme. To implement this scheme, an output of clipping block 124 is converted to the frequency domain and FREC 132 generates an echo estimate in response thereto. Additionally, CES write 130 provides data transferred from memory 64 to CES module 134. It should be noted again that CES module 134 corresponds to CES module 74 of FIG. 2. In CES module 134, a cancellation signal is calculated for removing the effects of interference from the echo in the receive signal. The cancellation signal is subsequently subtracted from the received signal using adder 142. Additionally, the estimated echo value is subtracted from a filtered and demodulated value provided by FFT module 140 using adder 144.

DESCRIPTION OF THE PERIPHERAL MODULES

Digital interface 70 is illustrated in greater detail in FIG. 5. During operation, a user will write the CONRT bit 72 to indicate whether or not ADSL transceiver 5 should operate as a central office or a remote terminal. If ADSL transceiver 5 should be operated as a central office, CONRT bit 72 is set to a logic level 1. When the CONRT bit 72 is set to a logic level 1, data transferred via frame input signal is provided to multiplexer 172 and multiplexer 174. Multiplexer 172 will not pass the information to small memory 178. However, multiplexer 174 will pass the information to large memory 176. Large memory 176 will subsequently provide a corresponding data value to each of multiplexer 180 and 182. Again, the CONRT bit selectively enables multiplexers 180 and 182. When so enabled, multiplexer 182 provides data by large memory 176 to transmit circuit 166. However, multiplexer 180 does not output any data. Transmit circuit 166 passes the data to each of the multiplexers 154 and 156. There, the CONRT bit selectively enables each of multiplexers 154 and 156 to provide data to large memory 158 and small memory 160, respectively. Because the CONRT bit is a logic level 1, multiplexer 154 provides the access information to large memory 158. Subsequently, multiplexer 162 provides the data output from large memory 158 as an output data signal. Thus, it is illustrated that when digital interface 70 is configure by the CONRT bit 72 to operate as a central office, larger buffers, large memory 158 and large memory 176, are utilized along the transmit path which is the path from FRAME INPUT to OUTPUT DATA because ADSL transceiver 5 will be required to provide data at a higher transmission rate and, therefore, enough data must be buffered to provide the output data signal at the required transmission rate without waiting. Also, when ADSL transceiver is configured to operate as the central office, input data is provided at a slower data rate. Therefore, only small buffer memories are required and implemented in the receive path of the digital interface, which is the path from INPUT DATA to frame output of the present invention. Note that while the digital interface 70 accesses the CONRT bit directly, a different or mirror control register can reside in a peripheral to avoid accessing a register over the system bus.

FIG. 6 illustrates, in block diagram form, circular echo synthesis (CES) module 74 of ADSL transceiver 5 of FIG. 2. CES module 74 performs the time domain echo cancellation of ADSL transceiver 5. CES module 74 removes the effects of the intersymbol interference from the echo symbols and makes the echo symbols look like a circular convolution of the transmitted symbol and the echo channel response. Creating the circular convolution is necessary in order to allow further frequency domain echo cancellation to estimate and remove the echo with simple block arithmetic rather than long linear convolutions or complex finite impulse response (FIR) filter operations.

In general, CES module 74 inputs the digital transmit signal and filters this signal in a digital finite impulse response (FIR) filter. The coefficients of the filter represent the impulse response of the channel, and are estimated at initialization. The output of this filter is an estimate of the echo of the transmit signal reflected back into the received signal. By subtracting the output of this filter from the received signal, CES module 74 is able to construct a more accurate representation of the signal sent by the remote station.

CES module 74 performs different operations depending on whether ADSL transceiver 5 is configured as CO or as RT. When configured as RT, CES module 74 interpolates a digital representation of the analog transmit signal to provide a digital cancellation signal. When configured as CO, CES module 74 performs a different operation to provide the digital cancellation signal. In the CO case, CES module 74 receives a digital representation of the analog transmit signal and decimates said second cancellation signal to provide the cancellation signal. In either case, transceiver 5 subtracts the cancellation signal from the received signal to provide a preconditioned version of the received signal for echo cancellation. The reuse of the same hardware in CES module 74 between CO and RT mode allows a significant savings in circuit area.

In greater detail, CES module 74 is a hardware peripheral coprocessor which communicates with DSP core 60 over PIO_EB bus 62 through decode and control circuit 206. CES module 74 acts as a slave device which DSP core 60 is able to read from and write to. Decode and control circuit 206 decodes a 12-bit address conducted on PIO_EB bus 62 to recognize operations that DSP core 60 conducts with CES module 74. When decode and control circuit 206 recognizes an access from DSP core 60, it provides the control signals to the other internal blocks of CES module 74 which are necessary to load data into the registers or buffers and to write data onto PIO_EB bus 62.

Command and status register 204 provides the primary mechanism for communication between DSP core 60 and CES module 74. Command and status register 204 provides configuration and control bits for CES module 74 and contains flags that can be read by DSP core 60. The commands include software reset, CES enable, cyclic prefix indicator, and enable signals for the interrupt request that indicates a CES calculation is done.

Parameter registers portion 202 hold parameters that CES module 74 uses during its echo cancellation calculations. The parameters include the amount of symbol misalignment, the echo channel impulse response length, and certain boundary values to perform the addressing of the data buffers. Parameter registers portion 202 are loaded during initialization and remain static during operation of CES module 74. Coefficient memory 200 provides buffering for echo channel impulse response coefficients. These coefficients are determined during the initial training period and loaded into coefficient memory 200 by DSP core 60. CES module 74 requires samples of the past, present, and next transmit symbols in order to perform the time domain echo cancellation. These samples must be available during the echo cancellation calculations. These samples are stored in present data buffer 208 and past data buffer 214.

Subtractor 210 takes the difference between a sample in past data buffer 214 and the corresponding sample in present data buffer 208. The differences, provided at the output of subtractor 210, are stored in subtract terms buffer 212. The subtract terms are multiplied by the estimated echo channel impulse response coefficients to form the cancellation vector. The multiplication and summing operation occurs in MAC 218, which does the actual calculation of the cancellation vector elements. Each cycle during the calculation, MAC 218 reads a subtraction term from the subtract terms buffer 212 and a corresponding echo channel impulse response coefficient from coefficient memory 200.

Process control circuit 216 is a state machine controller which coordinates all of the functions in CES module 74. Process control circuit 216 controls MAC 218, subtract terms buffer 212, and coefficient memory 200, to implement the interpolation or decimation required to match transmit and receive sample rates. When configured as CO, each transmit symbol contains 512 samples plus a 32 sample cyclic prefix, while each receive symbol contains only 64 samples plus a 4-sample cyclic prefix. Since CES module 74 generates the cancellation vector at the highest rate, it contains 544 samples. CES module 74 thus decimates the cancellation vector by a factor of eight to match the receive data sample rate. CES module 74 accomplishes the decimation by discarding seven of every eight elements of the cancellation vector. Rather than perform all of the calculations needed for all the elements of the cancellation vector, however, CES module 74 only calculates the elements that will be used.

When configured as RT, each transmit symbol contains 64 samples plus a 4-sample cyclic prefix. Each transmit symbol must be interpolated up to the higher rate before the echo cancellation calculation is performed. This is accomplished by inserting seven zeros between each transmit data sample. The result is that seven of every eight subtraction terms that are generated will be zero. Rather than performing the calculations associated with the subtraction terms which are zero, CES module 74 only performs the calculations on the non-zero terms.

FIG. 7 illustrates, in block diagram form, fast Fourier transform (FFT) module 73 of ADSL transceiver 5. FFT module 73 performs forward and inverse transformations between the time domain and frequency domain. These conversions are necessary to form and interpret the complex symbols used in the discrete multi-tone (DMT) system of ADSL. These transformations are performed on the asymmetric data which is transmitted at a high rate from the CO to the RT. Thus, when ADSL transceiver 5 is configured as CO, FFT module 73 performs an inverse FFT operation on a digital representation of the analog transmit signal. When ADSL transceiver 5 is configured as RT, FFT module 73 performs an FFT operation on a digital representation of the analog receive signal using the same circuitry.

Command and status register 302 is a unified register for communication between DSP core 60 and FFT module 73. Command and status register 302 is only connected to the GDB portion of PIO_EB bus 62. Control bits in command and status register 302 are provided to enable interrupts and DMA requests to DSP core 60. Interrupts occur for the input ready, output ready, and error conditions. DMA requests occur for input and output vector transfer. Command and status register 302 also includes bits to indicate the state of FFT module 73 to DSP core 60.

IN register 306 is a 24-bit register which receives input data from both the Module DMA Data Bus (MDDB) and Global Data Bus (GDB) portions of PIO_EB bus 62. This input data is in fractional two's complement form that represent either time domain samples, or frequency domain complex samples. In the illustrated embodiment, FFT module 73 discards the four least significant bits to adapt the 24-bit quantity to the 20-bit internal size. Out register 310 provides the output of the transform operation to DSP core 60. The output data is in the form of 24-bit fractional two's complement numbers that represent either time domain samples, or frequency domain complex samples. FFT module 73 sets the four least significant bits to zero to convert the 20-bit internal size into the 24-bit external format.

Transform engine 308 is an arithmetic unit which performs arithmetic and logical operations necessary for the FFT and IFFT algorithms. Quadrature amplitude modulation involves the multiplication of a complex phasor x by a sinusoidal modulation function, such as the complex exponential. This modulation function is called the carrier. DMT modulation extends this process by taking a vector of complex phasors and performing a dot-product of these with a vector of evenly spaced carriers. This DMT modulation is then equivalent to the discrete Fourier transform (DFT). The DFT is discrete in both time and frequency. Mathematically, the forward complex DFT performs the following calculation:

$$X_k = \Sigma x_n W_N^{nk} \qquad [1]$$

where $W_N = e^{-j2\pi/N}$, N defines the length of the DFT, and the summing interval is from n=0 to (N−1).

The inverse complex DFT, or IDFT, performs the following calculation:

$$x_n = (1/N)\Sigma X_k W_N^{-nk} \qquad [2]$$

where the summing interval is from k=0 to (N−1).

FFT module 73 allows configuration as either CO or RT by recognizing that the same arithmetic hardware can be used to perform the calculations of equations [1] and [2]. Thus, transform engine 308 includes a register file, separate X and Y random access memories (RAMs), an arithmetic logic unit, a read-only memory (ROM) for storing parameters, a multiply-and-accumulate unit (MAC), a separate accumulator, and a rounding function which are used commonly when FFT module is configured as either CO or RT, thus saving circuit area and allowing transceiver 5 to efficiently implement both functions.

FFT control circuit 304 is a state machine which controls the operation of transform engine 308 and out register 310. In addition, if a corresponding enable bit in command and status register 302 is set, FFT control circuit 304 provides the interrupt request or DMA request to DSP core 60 via PIO_EB bus 62. FFT control circuit 304 starts the transform engine after the input vector has been completed. The input vector is received by in register 306. FFT control then performs the DFT or IDFT as appropriate on that new vector. Finally, FFT control circuit 304 causes the output of transform engine 308 to be written into out register 310, and updates command and status register 302, possibly issuing an interrupt or DMA request. FFT control circuit 304 continues this writing sequence until the output vector is finished, at which time FFT control circuit 304 signals that the output buffer is ready.

FIG. 8 illustrates, in block diagram form, time domain equalization (TEQ) module 76 of transceiver 5. TEQ module 76 includes two flexible filter structures that can be used to perform a variety of filtering tasks. When transceiver 5 is configured as CO, TEQ module 76 is placed in the transmit path. DSP core 60 provides coefficients to TEQ module 76 to configure the FIR filter to perform roll off compensation for the analog filter. The FIR filter compensates for the droop in the transmit spectrum caused by the comb filter in the following digital-to-analog converter. TEQ module 76 configures the biquad filter to operate on the output of the FIR filter. The biquad filter is an IIR filter and DSP core 60 configures it to operate as a high-pass filter which limits the amount of low frequency energy in the transmitted ADSL signal.

When configured as RT, the FIR filter structure is used to perform a filtering operation that effectively shortens the response length of the channel. The shortened length is one greater than the length of the cyclic prefix in order to eliminate intersymbol and intercarrier interference in the received data. In RT mode, TEQ module 76 configures the biquad filter to operate on input data received from DSP core 60. The biquad filter structure also is used in the receive path to implement one of the two biquad filters required to remove signal energy in the POTS (plain old telephone system) frequency band from the received ADSL signal.

Command and status register 418 is a unified register for communication between DSP core 60 and TEQ module 76. Command and status register 418 is only connected to the GDB portion of PIO_EB bus 62. Control bits in command and status register 418 are provided to configure and control the FIR and biquad filters and contain status flags that can be read by DSP core 60. Control information includes software reset, enable signals for each filter, enable signals for interrupt requests or DMA requests to transfer input and output data, and an enable signal to allow FIR filter coefficients to be loaded into tap coefficient memory 404.

TEQ module 76 is a hardware coprocessor that communicates with DSP core 60 over PIO_EB bus 62. TEQ module 76 acts as a slave device which is read from and written to by DSP core 60. Decode and control circuit 414 performs address decoding and handshaking for received commands. When a command has been decoded, decode and control circuit 414 provides the control signals to the other blocks of TEQ module 76 to operate in the selected mode. Process control circuit 412 is a state machine controller that coordinates the functions in TEQ module 76. Process control circuit 412 loads the tap coefficients for the filters, receives the appropriate input data and loads it into receive sample memory 408, coordinates the multiply-accumulate function in MAC 410, and stores the filtered output sample to output register 416.

TEQ module 76 includes several blocks which have both FIR and biquad filter portions and these separate portions are noted where appropriate. Input register 402 has a first portion for receiving input data for the FIR filter, and a second portion for receiving input data for the biquad filter. For each new sample that DSP core 60 provides to input register 402, TEQ module 76 provides one filtered output sample to a corresponding portion of output register 416. A first portion of coefficient register 400 receives and stores an FIR filter tap coefficient which is thereafter stored in a first portion of tap coefficient memory 404. A second portion of coefficient register 400 receives and stores a biquad filter coefficient which is thereafter stored in a second portion of tap coefficient memory 404. These coefficients are determined during training and in the illustrated embodiment, tap coefficient memory 404 stores seventeen 22-bit FIR filter tap coefficients and five 22-bit biquad filter coefficients. Receive sample memory 408 has a first portion for storing the 17 most recent samples of data as they are received at input register 402 for use in the FIR filter, and a second portion for storing the current sample and two previously computed intermediate node values for use in the biquad filter. MAC 410 includes a single multiply-andaccumulate unit, which first multiplies the FIR filter coefficients by the corresponding samples and accumulates the sum of seventeen multiplications before providing the filtered result to output register 416. It then multiplies the input data and stored intermediate data samples by the five biquad tap coefficients in tap coefficient memory 404, and accumulates these products into the new intermediate and filtered values. The result of the biquad filter operation is a filtered sample which is provided to output register 416.

MUX 406 is selectable between CO and RT mode to selectively provide alternate sources of input data for the biquad filter. When the transceiver is in steady state operation and configured as a CO or an RT, the command and status register 418 configures MUX 406 to select the output of the FIR MAC operation to input to the biquad filter portion of receive sample memory 408. During training, when configured as RT, the command and status register 418 configures MUX 406 to select input data received by the biquad portion of input register 402 to input to the biquad filter portion of receive sample memory 408. The reconfiguration of the source of input data for the biquad filter allows TEQ module 76 to share resources and transceiver 5 to efficiently operate as either CO or RT.

FIG. 9 illustrates, in block diagram form, analog front-end (AFE) 78 of transceiver 5. Analog front-end 78 includes a DAC function which is implemented by interpolating filter 500, modulator 502, DAC 506, and analog smoothing filter 507, for use in the transmit path, and an ADC function implemented by ADC 512 and decimation filter 513 for use in the receive path. Analog front-end 78 is selectively configured to operate differently in either CO or RT mode because of the asymmetric nature of the ADSL communication system. There are two aspects of this asymmetric nature.

First, the receive path is relatively high-rate data if transceiver 5 is configured as RT, but relatively low-rate data if transceiver 5 is configured as CO. When configured as an RT, the receive path of the transceiver utilizes both second-order stages of the cascaded fourth-order sigma-delta modulator to convert the analog data to digital data, and the entire decimation filter 513 is used to implement a fifth order decimation on the output from the modulators. When configured as a CO, the receive path of the transceiver utilizes a single second-order stage of the cascaded sigma-delta modulator to convert the received analog data to digital data, and only a portion of the decimation filter 513 is used to implement a third-order decimation on the output from the modulators.

Second, the RT transmitter requires a different interpolator than the CO transmitter. As such, the configuration register value CONRT is used to determine what interpolation order should be used. In one embodiment, an interpolation order of three is used when in CO mode, and an order of five is used when in RT mode. In addition, it would be understood by one skilled in the art, that the smoothing filter 507 characteristics can vary based on whether operating in RT mode or in CO mode.

Control register 522 is a unified register for communication between DSP core 60 and analog front-end 78. Control register 522 is only connected to the GDB portion of PIO_EB bus 62. Control bits in command and status register 418 are provided to select between CO and RT modes, to select the oversampling ratio of DAC 506, to configure PEQ 514, to enable a power cut clipping and impulse approximation clipping algorithms, and to enable low power mode.

VCXO 518 is a pulled-crystal oscillator designed for use with external crystal 600. VCXO 518 has a nominal frequency which is set by crystal 600 but the frequency may be "pulled" higher or lower based on the value stored in VCXO register 520. The central office crystal will lock onto the frequency of the free running crystal at the remote terminal. Thus if transceiver 5 is RT, VCXO will normally be free running. The output of VCXO 518 is used by clock block 516 to generate both the ANALOG CLOCKS and the DIGITAL CLOCKS.

Register 504 stores an input to the AFE 78. The interpolator 500 performs a twenty-five times sample rate increase when in CO mode, and a 200 times sample rate increase when configured as an RT. When configured as RT, the interpolator provides a four stage cascaded integrated comb (CIC) filter to accommodate the high filtering requirements of the RT transmitter. When configured as CO, the interpolator only provides a second-order CIC filter. Preferably, the interpolator includes four stages, only two of which are used in CO mode. The modulator is a second order sigma-delta modulator with a three-bit quantizer. DAC 506 converts the 3-bit output of modulator 502 and converts it into an analog signal. The analog lowpass filter reduces quantization noise which modulator 502 has shifted out of the passband. Driver 508 is a variable gain driver which in conjunction with TXLD 604 provides a 20 dBm signal to a 200 ohm differential resistive load that is the series connection of 100 ohms of source resistance and 100 ohms of line impedance, assuming a 1:1 transformer is used.

Attenuator 602 is formed with off-chip discrete elements and an on-chip variable resistance. The off-chip discrete elements include series 1 kilo-ohm resistors in series with positive and negative outputs of hybrid circuit 606, and a 120 nano-farad capacitor in series with a 20 milli-Henry inductor connected between the positive and negative outputs. The on-chip resistance can provide values of open, 10.6 k$\Omega$, 4.8 k$\Omega$, 3.0 k$\Omega$, 2.0 k$\Omega$, . . . , 200$\Omega$, to produce attenuation of 0dB, 1.5dB, 3dB, . . ., 21dB with the external 1 K$\Omega$ resistor pair. PEQ 514 is an analog filter which provides a variable gain and provides a zero in the transfer function if the appropriate bit in control register 522 is set.

ADC 512 is a multi-bit, fourth-order sigma-delta ADC which is a cascade of two single bit second-order loops. When transceiver 5 is configured as RT, ADC 512 uses the whole fourth order modulator, and the output of the two cascaded loops are input to a recombination filter. When transceiver 5 is configured as CO, however, ADC only uses one of the second order loops without the recombination filter. The output of the modulator is decimated in a 28-bit digital CIC filter, which provides a large amount of lowpass filtering. Again in CO mode ADC 512 uses only a portion of the decimator that ADC 512 uses in RT mode. The decimator converts the one-bit output into 28-bit words, of which the most significant 24 bits are read by DSP core 60. Register 510 then stores the 24-bit word for subsequent reading by DSP core 60 via PIO_EB bus 62.

The implementation of the invention described herein is provided by way of example only. However, many other implementations may exist for executing the functions described herein. While the present invention has been illustrated and described with reference to specific embodiments, further modifications and improvements will occur to those skilled in the art. For example, the control signal which configures peripheral modules in either CO or RT mode may be received and stored in a global register and driven to the peripheral modules, received at an input pin and driven to the peripheral modules, or stored locally within a control register in each peripheral module. Furthermore, the type of signal processing functions which are altered depending on the selection as CO or RT may vary from the examples cited herein. Also, in an actual embodiment different portions of the signal processing function may be implemented by hardware and firmware. It is to be understood, therefore, that this invention is not limited to the particular forms illustrated herein and that the appended claims cover all modifications that do not depart from the scope of this invention.

We claim:

1. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;

said signal processor comprising:

control means for determining whether said first data rate is a first predetermined data rate and said second data rate is a second predetermined data rate, or whether said first data rate is said second predetermined data rate and said second data rate is said first predetermined data rate; and a digital interface having an input coupled to said control means and operable in first and second modes in response to said control means being in a first logic state or a second logic state, respectively, said digital interface converting said digital transmit signal into a plurality of transmit symbols at said first data rate, and converting a plurality of receive symbols received at said second data rate into said digital receive signal, wherein said digital interface uses a first memory buffer for converting said digital transmit signal into said plurality of transmit symbols and uses a second memory buffer which is smaller than said first memory buffer for converting said plurality of receive symbols into said digital receive signal when said control means indicates said first logic state, and wherein said digital interface uses said second memory buffer for converting said digital transmit signal into said plurality of transmit symbols and uses said first memory buffer for converting said plurality of receive symbols into said digital receive signal when said control means indicates said second logic state, wherein said transceiver is selectively operable at either end of said asymmetrical communication link.

2. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;

said signal processor comprising:

control means for determining whether said first data rate is a first predetermined data rate and said second data rate is a second predetermined data rate, or whether said first data rate is said second predetermined data rate and said second data rate is said first predetermined data rate; and a circular echo synthesis (CES) module having an input coupled to said control means and operable in first and second modes in response to said control means being in a first logic state or a second logic state, respectively, wherein said CES module interpolates a transmit signal representation based on the digital representation of the analog transmit signal to provide a cancellation signal when said control means indicates said first logic state, and which generates a second cancellation signal in response to said transmit signal representation and decimates said second cancellation signal to provide said cancellation signal when said control means indicates said second logic state, wherein said signal processor subtracts said cancellation signal from a receive signal representation based on the digital representation of the analog receive signal, wherein said transceiver is selectively operable at either end of said asymmetrical communication link.

3. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;

said signal processor comprising:

control means for determining whether said first data rate is a first predetermined data rate and said second data rate is a second predetermined data rate, or whether said first data rate is said second predetermined data rate and said second data rate is said first predetermined data rate; and a fast Fourier transform (FFT) module having an input coupled to said control means and operable in first and second modes in response to said control means being in a first logic state or a second logic state, respectively, wherein said FFT module performs an inverse FFT on a first transmit signal representation based on the digital representation of the analog transmit signal to provide a second transmit signal representation based on the digital representation of the analog transmit signal when said control means indicates said first logic state, and which performs an FFT on a first receive signal representation based on the digital representation of the analog receive signal to provide a second receive signal representation based on the digital representation of the analog receive signal when said control means indicates said second logic state, wherein said transceiver is selectively operable at either end of said asymmetrical communication link.

4. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;

said signal processor comprising:

control means for determining whether said first data rate is a first predetermined data rate and said second data rate is a second predetermined data rate, or whether said first data rate is said second predetermined data rate and said second data rate is said first predetermined data rate; and a filter having an input coupled to said control means and operable in first and second modes in response to said control means being in a first logic state or a second logic state, respectively, wherein when said control means indicates said first logic state said filter filters a first transmit signal representation based on the digital representation of the analog transmit signal to provide a second transmit signal representation based on the digital representation of the analog transmit signal, and wherein when control means indicates said second logic state said filter filters a first receive signal representation based on the digital representation of the analog transmit signal to provide a second transmit signal representation based on the digital representation of the analog transmit signal, wherein said transceiver is selectively operable at either end of said asymmetrical communication link.

5. The transceiver of claim 4 wherein said filter comprises a digital finite impulse response (FIR) filter, wherein when said control means indicates the said first logic state said digital FIR filter operates with a first set of coefficients and wherein when said control means indicates the said second logic state said digital FIR filter operates with a second set of coefficients.

6. The transceiver of claim 5 wherein said second set of coefficients differs from said first set of coefficients.

7. The transceiver of claim 4 wherein said filter comprises a digital biquadratic filter, wherein when said control means indicates said first logic state said digital biquadratic filter operates with a first set of coefficients and wherein when said control means indicates said second logic state said digital biquadratic filter operates with a second set of coefficients.

8. The transceiver of claim 4 wherein said filter further comprises an analog filter, wherein when said control means indicates said first logic state said analog filter has a first pole-zero characteristic and wherein when said control means indicates said second logic state said analog filter has a second pole-zero characteristic.

9. A transceiver for an asymmetric communication system, comprising:
 a transmit port adapted for coupling to an asymmetrical communication link, said transmit port transmitting data at a first data rate;
 a receive port adapted for coupling to said asymmetrical communication link, said receive port receiving data at a second data rate;
 a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;
 said signal processor comprising:
  control means for determining whether said first data rate is a first predetermined data rate and said second data rate is a second predetermined data rate, or whether said first data rate is said second predetermined data rate and said second data rate is said first predetermined data rate;
  an analog front end module having an input coupled to said control means and operable in first and second modes in response to said control means being in a first logic state or a second logic state, respectively, comprising:
   an interpolator having an input for receiving a first transmit signal representation based on the digital representation of the analog transmit signal, and an output; and
   an oversampled modulator having an input coupled to said output of said interpolator, and an output coupled to said transmit port,
  wherein when said control means indicates said first logic state said interpolator has a first predetermined order and wherein when said control means indicates said second logic state said interpolator has a second predetermined order,
 wherein said transceiver is selectively operable at either end of said asymmetrical communication link.

10. A transceiver for an asymmetric communication system, comprising:
 a transmit port adapted for coupling to an asymmetrical communication link, said transmit port transmitting data at a first data rate;
 a receive port adapted for coupling to said asymmetrical communication link, said receive port receiving data at a second data rate;
 a signal processor having a data input terminal for receiving a digital transmit signal, a data output terminal for providing a digital receive signal, an input terminal coupled to said receive port, and an output terminal coupled to said transmit port, said signal processor converting said digital transmit signal into an analog transmit signal having a frequency content, and converting an analog receive signal into said digital receive signal according to said frequency content of said analog receive signal;
 said signal processor comprising:
  control means for determining whether said first data rate is a first predetermined data rate and said second data rate is a second predetermined data rate, or whether said first data rate is said second predetermined data rate and said second data rate is said first predetermined data rate; and
  an analog front end module having an input coupled to said control means and operable in first and second modes in response to said control means being in a first logic state or a second logic state, respectively,
  wherein said analog front end module comprises an oversampled analog-to-digital converter having an input coupled to said receive port, and an output for providing a representation of said analog receive signal, wherein when said control means indicates said second logic state said signal processor uses all of said oversampled analog-to-digital converter to convert said analog receive signal into said digital receive signal, and wherein when said control means indicates said first logic state said signal processor uses only a portion of said oversampled analog-to-digital converter to convert said analog receive signal into said digital receive signal,
 wherein said transceiver is selectively operable at either end of said asymmetrical communication link.

11. A transceiver for an asymmetric communication system, comprising:
 a transmit port adapted for coupling to an asymmetrical communication link, said transmit port transmitting data at a first data rate;
 a receive port adapted for coupling to said asymmetrical communication link, said receive port receiving data at a second data rate;
 a data processor coupled to an internal bus for accessing memory locations via said internal bus in response to a program;
 a plurality of peripheral modules coupled to said transmit port, said receive port, and said internal bus, wherein said data processor and said plurality of peripheral modules together process a digital transmit signal into a digital representation of an analog transmit signal having a frequency content, and process a digital representation of an analog receive signal into a digital receive signal; and
 each of said plurality of peripheral modules coupled to a control means for determining whether said first data rate is a first predetermined data rate and said second data rate is a second predetermined data rate when in a first logic state, or whether said first data rate is said second predetermined data rate and said second data rate is said first predetermined data rate when in a second logic state.

12. The transceiver of claim 11 wherein a portion of the peripheral modules are hardware modules.

13. The transceiver of claim 11 wherein a portion of the peripheral modules are software modules.

14. The transceiver of claim 11 wherein said data processor includes a direct memory access (DMA) channel having a programmable direction.

15. The transceiver of claim 11 further comprising a program memory coupled to said data processor having a first portion for storing a first plurality of instructions for configuring at least one of said plurality of peripheral modules when said control means indicates the said first logic state and a second portion for storing a second plurality of instructions for configuring at least one of said plurality of peripheral modules when said control means indicates the said second logic state.

16. The transceiver of claim 15 wherein the program memory further comprises a third portion for storing a plurality of software modules, wherein said data processor executes said plurality of software modules to process said digital transmit signal and said digital representation of an analog transmit signal.

17. The transceiver of claim 13 wherein said first plurality of instructions includes a first instruction which causes said data processor to set a control bit of said control means of said at least one of said plurality of peripheral modules to said first logic state, and wherein said second plurality of instructions includes a second instruction which causes said data processor to set said control bit of said control means of said at least one of said plurality of peripheral modules to said second logic state.

18. The transceiver of claim 11 wherein said data processor is characterized as being a digital signal processor.

19. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

an internal bus;

a data processor coupled to said internal bus for accessing memory locations via said internal bus in response to a program;

a digital interface coupled to said internal bus which processes a digital transmit signal into a plurality of transmit symbols at said first data rate, and processes a plurality of receive symbols received at said second data rate into a digital receive signal;

a plurality of signal processing peripherals coupled to said internal bus, wherein said data processor in conjunction with said plurality of signal processing peripherals processes said plurality of transmit symbols into a digital representation of an analog transmit signal, and processes a digital representation of an analog receive signal into said plurality of receive symbols; and control means for indicating whether said first data rate is a first predetermined data rate and said second data rate is a second predetermined data rate, or whether said first data rate is said second predetermined data rate and said second data rate is said first predetermined data rate;

said control bit further determining a mode of operation of at least one said digital interface and said plurality of signal processing peripherals.

20. The transceiver of claim 19 wherein said data processor further comprising:

an analog front end module having an input terminal coupled to said receive port, an output coupled to said transmit port, and a bi-directional terminal coupled to said internal bus, wherein said analog front end module processes the digital representation of an analog transmit signal into an analog transmit signal, and processes an analog receive signal into the digital representation of the analog receive signal.

21. The transceiver of claim 19 wherein said data processor further comprises a host processor interface having a first bi-directional signal terminal adapted to be coupled to an external data processor, and a second bi-directional terminal coupled to said internal bus, wherein said host processor interface allows said external data processor to communicate with said data processor.

22. The transceiver of claim 19 further comprising a memory coupled to said data processor for storing said program.

23. The transceiver of claim 19 characterized as being implemented within a single integrated circuit.

24. The transceiver of claim 19 wherein said plurality of signal processing peripherals comprises a circular echo synthesis (CES) module, a fast Fourier transform (FFT) module, and a time domain equalizer.

25. The transceiver of claim 19 in which each of said plurality of signal processing peripherals having a control means for indicating whether said first data rate is a first predetermined data rate and said second data rate is a second predetermined data rate, or whether said first data rate is said second predetermined data rate and said second data rate is said first predetermined data rate.

26. A transceiver for an asymmetric communication system, comprising:

a hardware portion for operating at a first data rate;

a software portion;

a data processor for executing the software portion to operate at a second data rate, wherein the second data rate is different the first data rate;

a control means for indicating when the transceiver is in one of a first state and a second state;

wherein, when the transceiver is in a first state, the hardware portion is in a data transmit path of the transceiver, and the software portion is in a data receive path of the transceiver; and wherein, when the transceiver is in a second state, the hardware portion is in the data receive path of the transceiver, and the software portion is in the data transmit path of the transceiver.

27. The transceiver of claim 26, wherein the hardware portion and the software portion perform similar functions.

28. The transceiver of claim 27, wherein the hardware portion and the software portion perform filtering functions.

29. The transceiver of claim 27, wherein the software portion is stored in non-volatile memory.

30. The transceiver of claim 26, wherein the hardware portion performs a first function when in the data transmit path, and a second function when in the data receive path.

31. The transceiver of claim 30, wherein the first function and the second function are substantially different.

32. The transceiver of claim 31, wherein the first function is an inverse fast Fourier transform function and the second function is a fast Fourier transform function.

33. The transceiver of claim 30, wherein the first function and the second function are substantially similar.

34. The transceiver of claim 33, wherein the first function and the second function perform a filtering function.

35. The transceiver of claim 1 wherein said signal processor further comprises an analog front end module for converting the digital representation of the analog transmit signal into said analog transmit signal, and for converting said analog receive signal into the digital representation of the analog receive signal.

36. The transceiver of claim 2 wherein said signal processor further comprises an analog front end module for converting the digital representation of the analog transmit signal into said analog transmit signal, and for converting said analog receive signal into the digital representation of the analog receive signal.

37. The transceiver of claim 3 wherein said signal processor further comprises an analog front end module for converting the digital representation of the analog transmit signal into said analog transmit signal, and for converting said analog receive signal into the digital representation of the analog receive signal.

38. The transceiver of claim 4 wherein said signal processor further comprises an analog front end module for converting the digital representation of the analog transmit signal into said analog transmit signal, and for converting said analog receive signal into the digital representation of the analog receive signal.

39. The transceiver of claim 9 wherein said analog front end module further converts said analog receive signal into the digital representation of the analog receive signal.

40. A transceiver for an asymmetric communication system, comprising:

a transmit port adapted for coupling to an asymmetrical communication link, said transmit port transmitting data at a first data rate;

a receive port adapted for coupling to said asymmetrical communication link, said receive port receiving data at a second data rate;

a signal processor having a data input terminal for receiving a digital transmit signal, a data output terminal for providing a digital receive signal, an input terminal coupled to said receive port, and an output terminal coupled to said transmit port, said signal processor converting said digital transmit signal into a digital representation of an analog transmit signal having a frequency content, and converting a digital representation of an analog receive signal into said digital receive signal according to a frequency content of the digital representation of the analog receive signal;

said signal processor comprising:

a digital interface having a digital port for being coupled to an external data processor, and a register, wherein said digital interface alters a state of at least one control bit of said register in response to a command received from said external data processor via said digital port;

said at least one control bit determining whether said first data rate is a first predetermined data rate and said second data rate is a second predetermined data rate, or whether said first data rate is said second predetermined data rate and said second data rate is said first predetermined data rate; and a signal processing module having an input coupled to said digital interface and operable in first and second modes in response to said at least one control bit being in a first logic state or a second logic state, respectively, wherein said external data processor is capable of configuring said transceiver to operate at either end of said asymmetrical communication link.

* * * * *